(12) United States Patent
Suzuki et al.

(10) Patent No.: US 12,210,458 B2
(45) Date of Patent: Jan. 28, 2025

(54) INFORMATION PROCESSING SYSTEM AND MEMORY SYSTEM

(71) Applicant: Kioxia Corporation, Tokyo (JP)

(72) Inventors: Tomoya Suzuki, Tokyo (JP); Kazuhiro Hiwada, Kamakura (JP)

(73) Assignee: Kioxia Corporation, Tokyo (JP)

( * ) Notice: Subject to any disclaimer, the term of this patent is extended or adjusted under 35 U.S.C. 154(b) by 162 days.

(21) Appl. No.: 17/807,806

(22) Filed: Jun. 20, 2022

(65) Prior Publication Data

US 2023/0297512 A1 Sep. 21, 2023

(30) Foreign Application Priority Data

Mar. 17, 2022 (JP) .................... 2022-042522

(51) Int. Cl.
*G06F 12/08* (2016.01)
*G06F 12/02* (2006.01)
(Continued)

(52) U.S. Cl.
CPC ...... *G06F 12/0895* (2013.01); *G06F 12/0238* (2013.01); *G06F 12/123* (2013.01); *G06F 2212/1021* (2013.01)

(58) Field of Classification Search
CPC ............ G06F 12/0895; G06F 12/0238; G06F 12/123; G06F 12/0831; G06F 12/0833; G06F 12/0891; G06F 12/06; G06F 12/02; G06F 12/0646; G06F 2212/1021; G06G 3/0611; G06G 3/0679; G06G 3/0656; G06G 3/0659

See application file for complete search history.

(56) References Cited

U.S. PATENT DOCUMENTS 7,039,765 B1 * 5/2006 Wilkes ............... G06F 12/0897
711/E12.019
10,474,588 B1 11/2019 Ugale et al.
(Continued)

FOREIGN PATENT DOCUMENTS

WO WO 2018/211749 A1 11/2018

OTHER PUBLICATIONS

Einziger, G., et al., "TinyLFU: A Highly Efficient Cache Admission Policy", arXiv:1512.00727v2, 2015, pp. 1-23 with cover page.
(Continued)

*Primary Examiner* — Tracy C Chan
(74) *Attorney, Agent, or Firm* — Oblon, McClelland, Maier & Neustadt, L.L.P.

(57) ABSTRACT

According to one embodiment, an information processing system includes a memory system including a non-volatile memory, and a host device including a host memory and a processor executing software for accessing data stored in the non-volatile memory. The processor is configured to: allocate a cache area in the host memory to cache data stored in the non-volatile memory; when the software is executed, perform a tag lookup of the cache area, and in a case where a cache hit has occurred upon the lookup, access the cache area without accessing the non-volatile memory; and refill the data stored in the non-volatile memory into the cache area at a second frequency lower than a first frequency at which a cache miss occurs.

20 Claims, 16 Drawing Sheets

(51) Int. Cl.
 *G06F 12/0895* (2016.01)
 *G06F 12/123* (2016.01)

(56) References Cited

U.S. PATENT DOCUMENTS

| | | |
|---|---|---|
| 10,552,329 B2 | 2/2020 | Chen et al. |
| 11,023,381 B2 | 6/2021 | Kaneda et al. |
| 11,886,354 B1* | 1/2024 | Rohillah ............. G06F 12/0891 |
| 2011/0289257 A1* | 11/2011 | Hathaway ............... G06F 12/12 |
| | | 711/3 |
| 2016/0275017 A1* | 9/2016 | Takeda ................ G06F 12/0893 |
| 2021/0294745 A1* | 9/2021 | Nakanishi ................. G06F 3/06 |

OTHER PUBLICATIONS

Li, X., et al., "Be Fast, Cheap and in Control with SwitchKV", 13$^{th}$ ISENIX Symposium on Networked Systems Design and Implementation (NSDI' 16), Mar. 2016, pp. 31-44 with cover pages.

Jin, X., et al., "NetCache: Balancing Key-Value Stores with Fast In-Network Caching", Proceedings of SOSP' 17, Oct. 2017, 16 pages.

* cited by examiner

410

| DAT1 | DAT(y+1) | DAT(2y+1) | ... | DAT((x-1)y+1) | ← Group "1" |
| DAT2 | DAT(y+2) | DAT(2y+2) | ... | DAT((x-1)y+2) | ← Group "2" |
| DAT3 | DAT(y+3) | DAT(2y+3) | ... | DAT((x-1)y+3) | ← Group "3" |
| ⋮ | ⋮ | ⋮ | ⋱ | ⋮ | |
| DATy | DAT(2y) | DAT(3y) | ... | DAT(xy) | ← Group "y" |

↑ Tag number "1"  ↑ Tag number "2"  ↑ Tag number "3"  ↑ Tag number "x"

F I G. 3

| Tag number | Valid flag | Cached data | |
|---|---|---|---|
| T1 | V1 | CDAT1 | ← Group "1" |
| T2 | V2 | CDAT2 | ← Group "2" |
| T3 | V3 | CDAT3 | ← Group "3" |
| ⋮ | ⋮ | ⋮ | |
| Ty | Vy | CDATy | ← Group "y" |

122a    121a

F I G. 4

| Tag number | Access count flag | Valid flag | Cached data | Access frequency information | |
|---|---|---|---|---|---|
| T1 | E1 | V1 | CDAT1 | A1 | ← Group "1" |
| T2 | E2 | V2 | CDAT2 | A2 | ← Group "2" |
| T3 | E3 | V3 | CDAT3 | A3 | ← Group "3" |
| ⋮ | ⋮ | ⋮ | ⋮ | ⋮ | |
| Ty | Ey | Vy | CDATy | Ax | ← Group "y" |

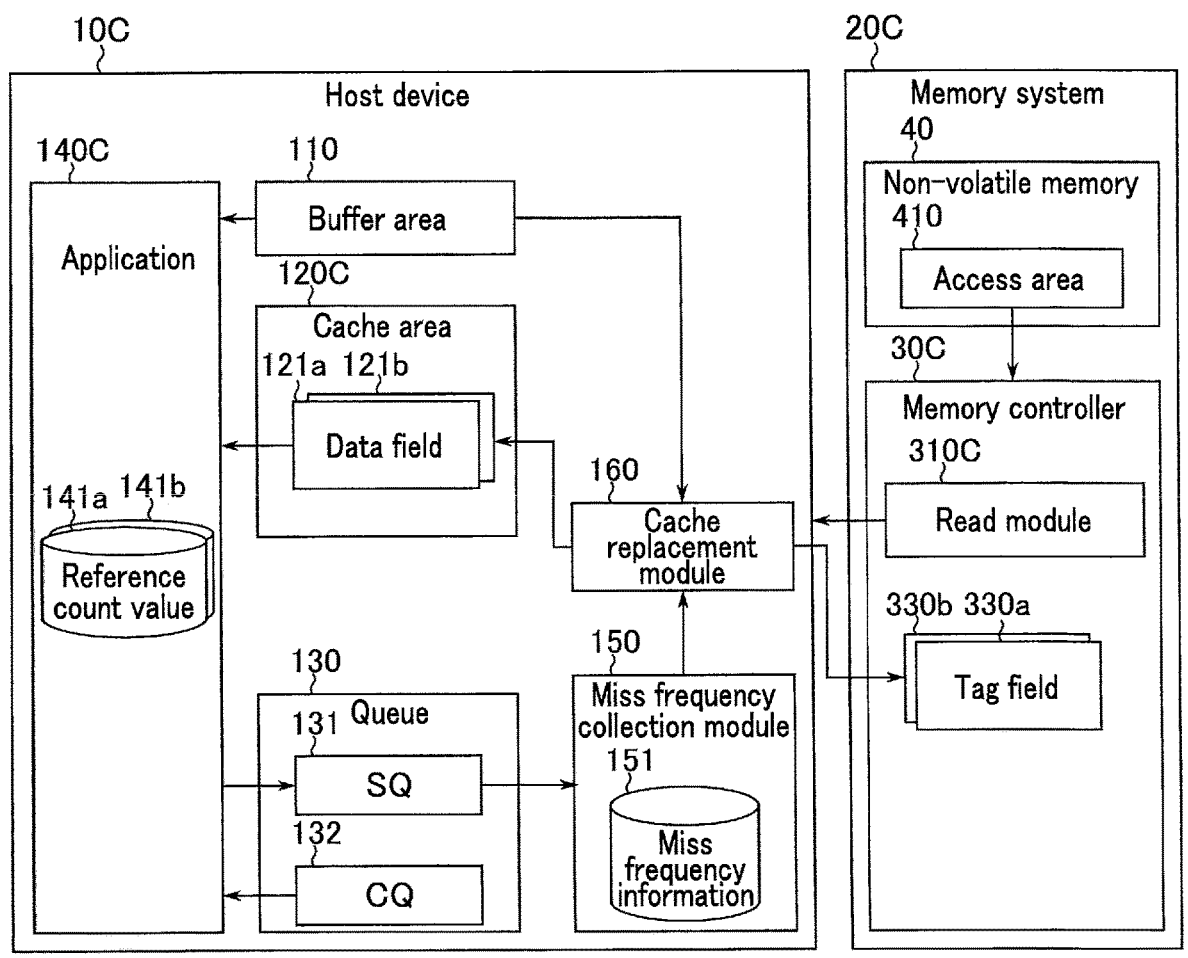
F I G. 17

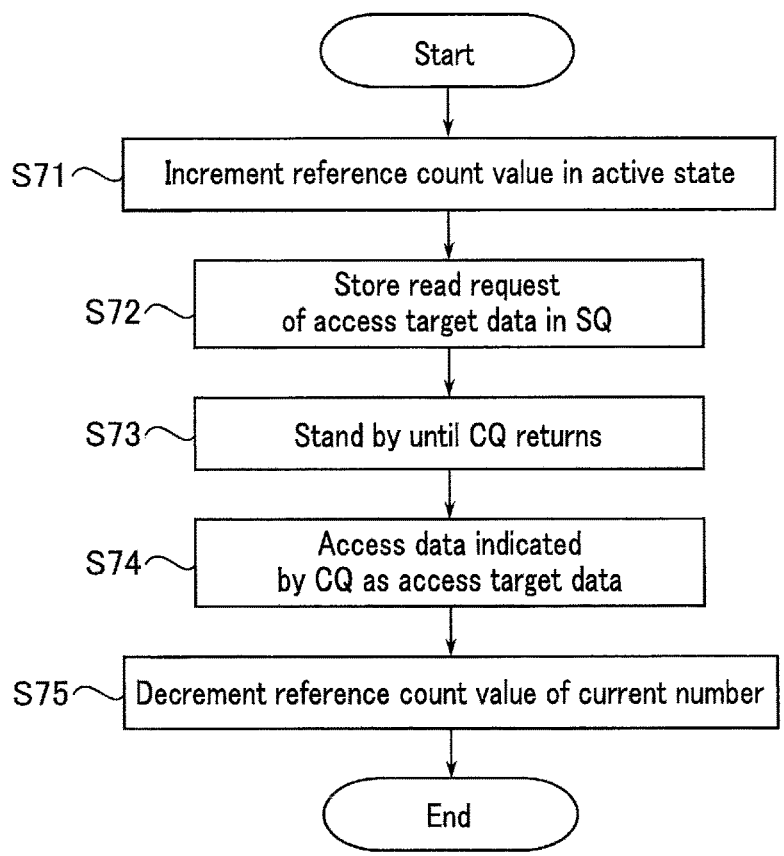
F I G. 18
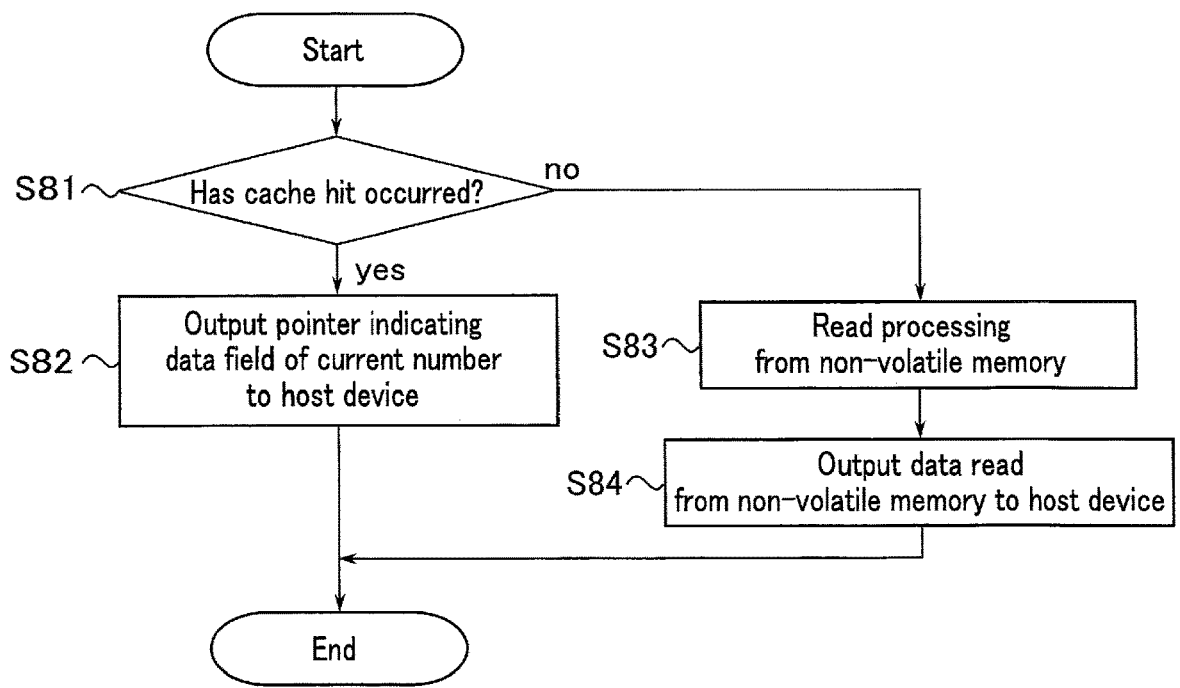
F I G. 19

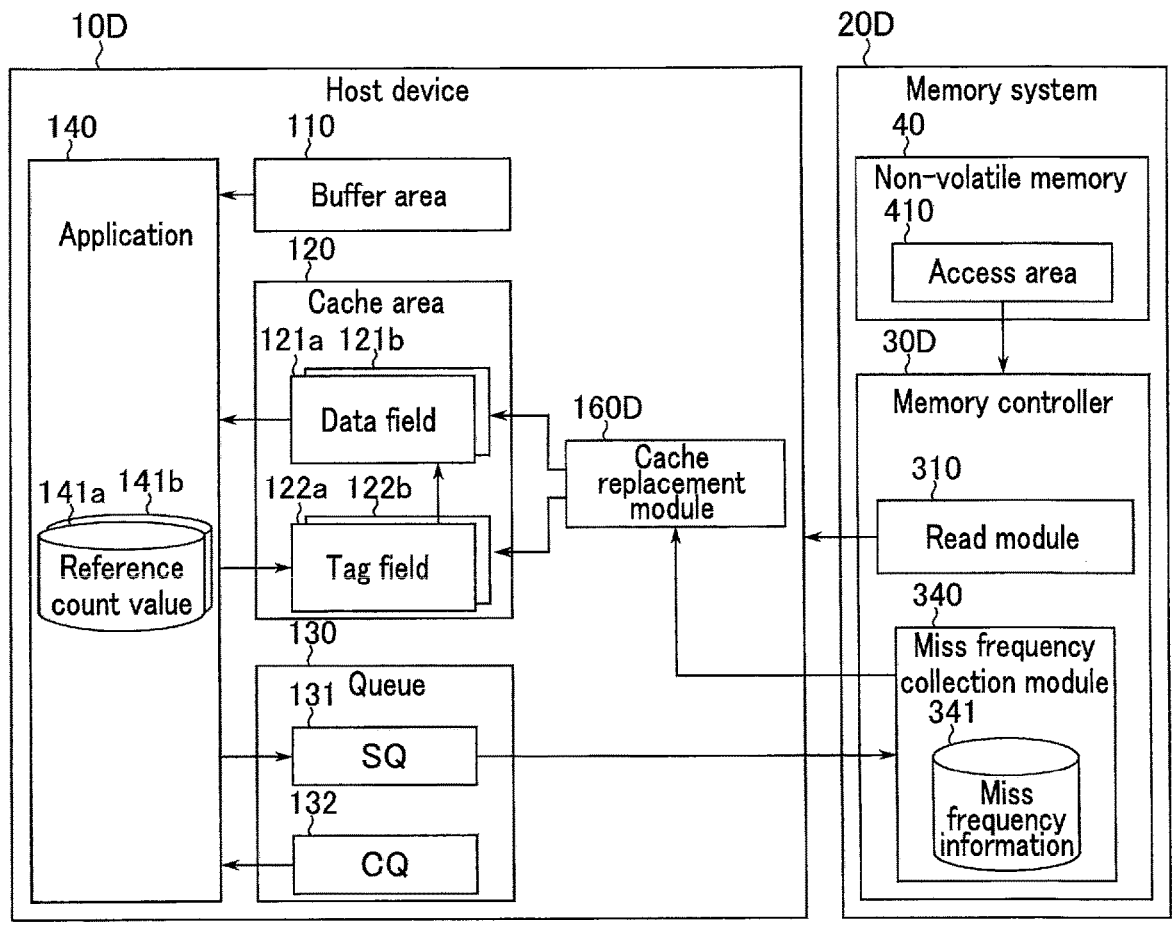
F I G. 20

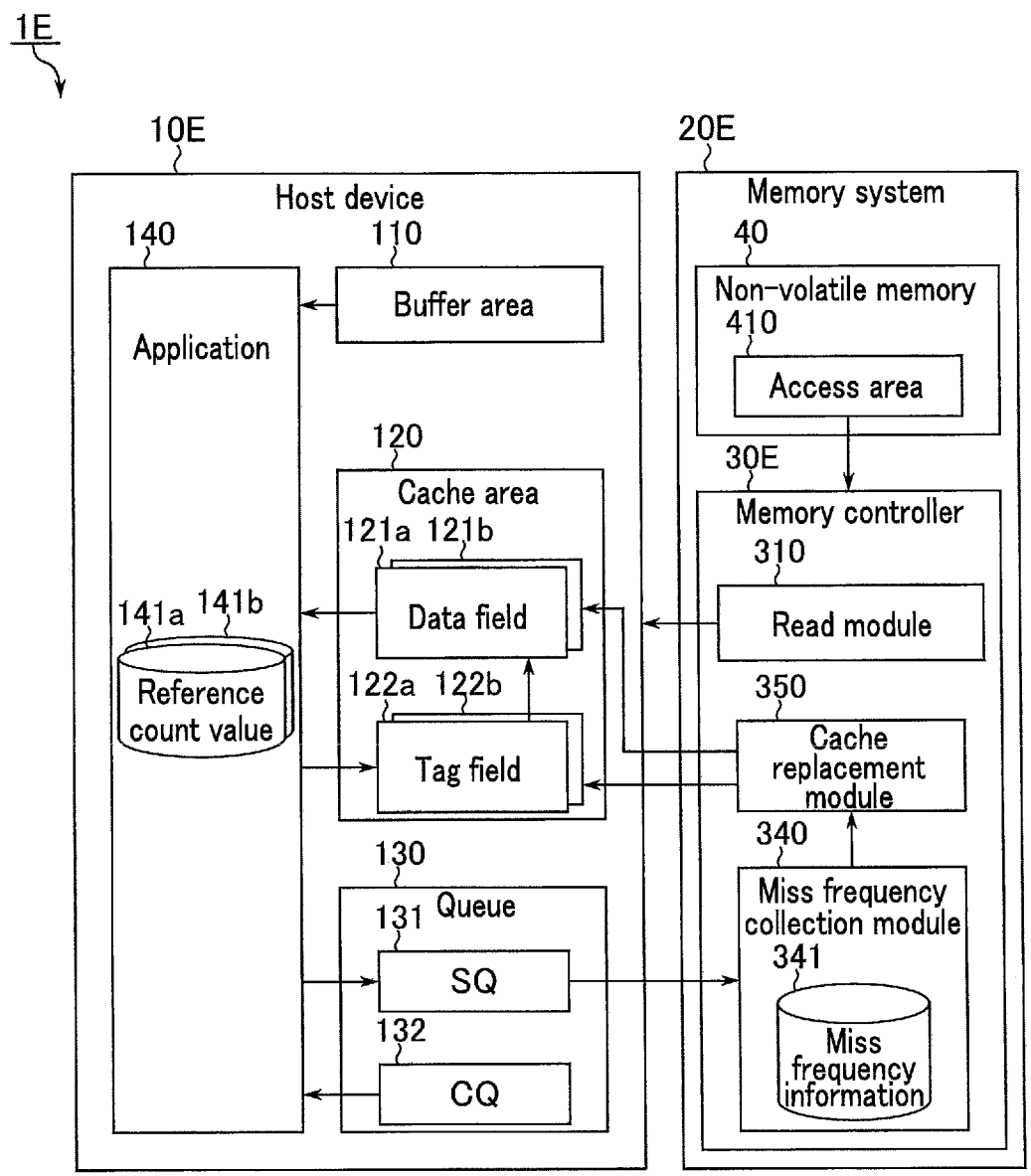
F I G. 21

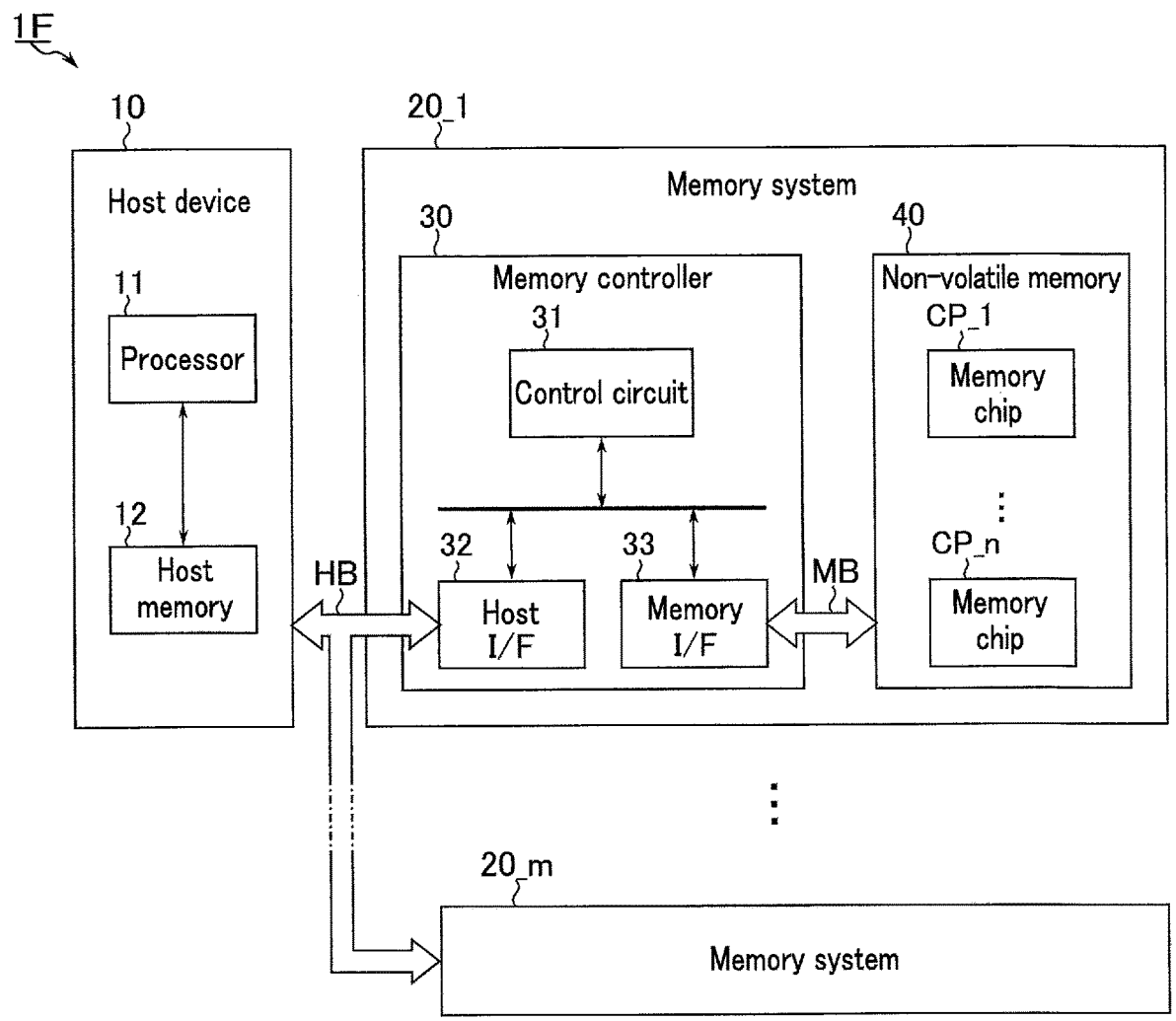
F I G. 23 i# INFORMATION PROCESSING SYSTEM AND MEMORY SYSTEM

CROSS-REFERENCE TO RELATED APPLICATIONS

This application is based upon and claims the benefit of priority from Japanese Patent Application No. 2022-042522, filed Mar. 17, 2022, the entire contents of which are incorporated herein by reference.

FIELD

Embodiments described herein relate generally to an information processing system and a memory system.

BACKGROUND

An information processing system including a host device and a memory system is known. The memory system includes a NAND flash memory as a non-volatile memory and a memory controller that controls the non-volatile memory. The memory controller reads data from the non-volatile memory in response to a request from the host device.

BRIEF DESCRIPTION OF THE DRAWINGS

FIG. 3 is a diagram illustrating an example of a configuration of an access area of the information processing system according to the first embodiment.

FIG. 4 is a diagram illustrating an example of a configuration of a cache area of the information processing system according to the first embodiment.

FIG. 17 is a block diagram illustrating an example of a functional configuration of an information processing system according to a fourth embodiment.

FIG. 18 is a flowchart illustrating an example of read access processing in an application of the information processing system according to the fourth embodiment.

FIG. 19 is a flowchart illustrating an example of a read processing in a read module of the information processing system according to the fourth embodiment.

FIG. 20 is a block diagram illustrating an example of a functional configuration of an information processing system according to a fifth embodiment.

FIG. 21 is a block diagram illustrating an example of a functional configuration of an information processing system according to a sixth embodiment.

FIG. 23 is a block diagram illustrating an example of a hardware configuration of an information processing system according to a modification.

DETAILED DESCRIPTION

Figure 1:
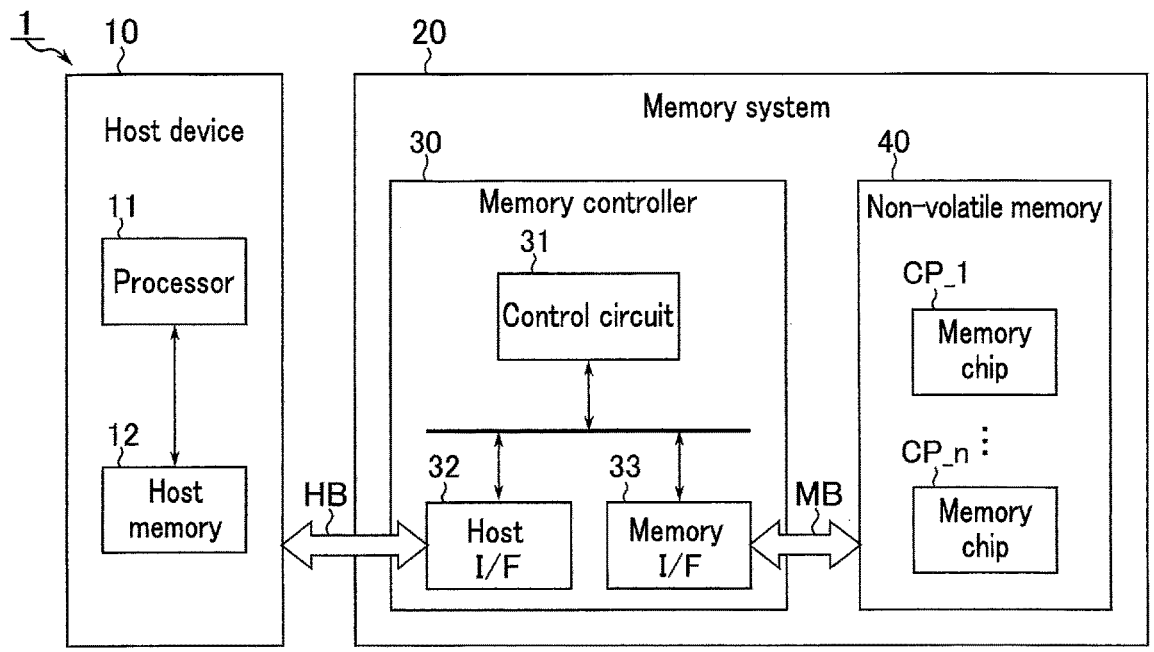
FIG. 1 is a block diagram illustrating an example of a hardware configuration of an information processing system according to a first embodiment.

In general, according to one embodiment, an information processing system includes a memory system including a non-volatile memory; and a host device including a host memory and a processor executing software for accessing data stored in the non-volatile memory. The processor is configured to: allocate a cache area in the host memory to cache data stored in the non-volatile memory; when the software is executed, perform a tag lookup of the cache area, and in a case where a cache hit has occurred upon the lookup, access the cache area without accessing the non-volatile memory; and refill the data stored in the non-volatile memory into the cache area at a second frequency lower than a first frequency at which a cache miss occurs.

Hereinafter, embodiments will be described with reference to the drawings. In the following description, components having the same function and configuration are denoted by the same reference numerals. In addition, in a case where a plurality of components having a common reference sign is distinguished, the common reference sign is added with a suffix to be distinguished. Note that, in a case where a plurality of components does not need to be particularly distinguished, only common reference numerals are attached to the plurality of components, and no suffixes are attached thereto.

1. First Embodiment

1.1 Configuration

A configuration of an information processing system according to a first embodiment will be described.

1.1.1 Hardware Configuration of Information Processing System

FIG. 1 is a block diagram illustrating an example of a hardware configuration of the information processing system according to the first embodiment, An information processing system 1 includes a host device 10 and a memory system 20.

The information processing system 1 is, for example, a personal computer or a server in a data center. The host device 10 includes a processor 11 and a host memory 12.

The processor 11 includes, for example, a central processing unit (CPU) and a graphics processing unit (GPU). The processor 11 requests input and output (access) of data to the memory system 20. For example, the processor 11 requests the memory system 20 to perform data write processing and read processing. Hereinafter, the request processing related to the read processing in the host device 10 is also referred to as read access processing.

The host memory 12 is, for example, a dynamic random access memory (DRAM). The host memory 12 is used as a work area when the processor 11 executes an operating system (OS), an application program, and the like. The host memory 12 is also used as a memory area for temporarily storing data read from the memory system 20.

The memory system 20 is a storage device configured to be coupled to the host device 10. The memory system 20 is, for example, a memory card such as an SD™ card, a universal flash storage (UFS), or a solid state drive (SSD). The memory system 20 includes a memory controller 30 and a non-volatile memory 40.

The memory controller 30 includes, for example, an integrated circuit such as a system-on-a-chip (SoC). The memory controller 30 includes a control circuit 31, a host interface circuit (host I/F) 32, and a memory interface circuit (memory I/F) 33.

The control circuit 31 includes, for example, a processor such as a CPU, a ROM, and a RAM. The control circuit 31 controls input and output of data between the host device 10 and the non-volatile memory 40. For example, the control circuit 31 executes read processing to read data from the non-volatile memory 40 in response to a read request from the host device 10.

The host interface circuit 32 manages communication between the host device 10 and the memory controller 30. The host interface circuit 32 is coupled to the host device 10 via a host bus HB. The host bus HB conforms to, for example, an SD™ interface, a serial attached SCSI (small computer system interface) (SAS), a serial ATA (advanced technology attachment) (SATA), or a PCI (peripheral component interconnect) Express™ (PCIe).

The memory interface circuit 33 manages communication between the non-volatile memory 40 and the memory controller 30. The memory interface circuit 33 is coupled to the non-volatile memory 40 via a memory bus MB. The memory bus MB conforms to, for example, a single data rate (SDR) interface, a toggle double data rate (DDR) interface, or an open NAND flash interface (ONFI).

The non-volatile memory 40 is, for example, a NAND flash memory. The non-volatile memory 40 includes a plurality of memory chips CP_1, ..., CP_n (n is an integer of 2 or more). Each of the plurality of memory chips CP_1 to CP_n includes a plurality of memory cells. Each of the plurality of memory cells stores data in a non-volatile manner.

Note that, in the above example, a configuration in which the host device 10 and the memory system 20 are assumed to be components in a personal computer or a server has been described, but the present invention is not limited thereto. For example, the host device 10 and the memory system 20 may be coupled to each other via a network. In this case, the information processing system 1 is a cluster including a plurality of servers. The memory system 20 is, for example, a storage server. In this case, the host bus HB coupling the host device 10 and the memory system 20 may be, for example, Ethernet™, InfiniBand, or the like.

1.1.2 Functional Configuration of Information Processing System

Figure 2:
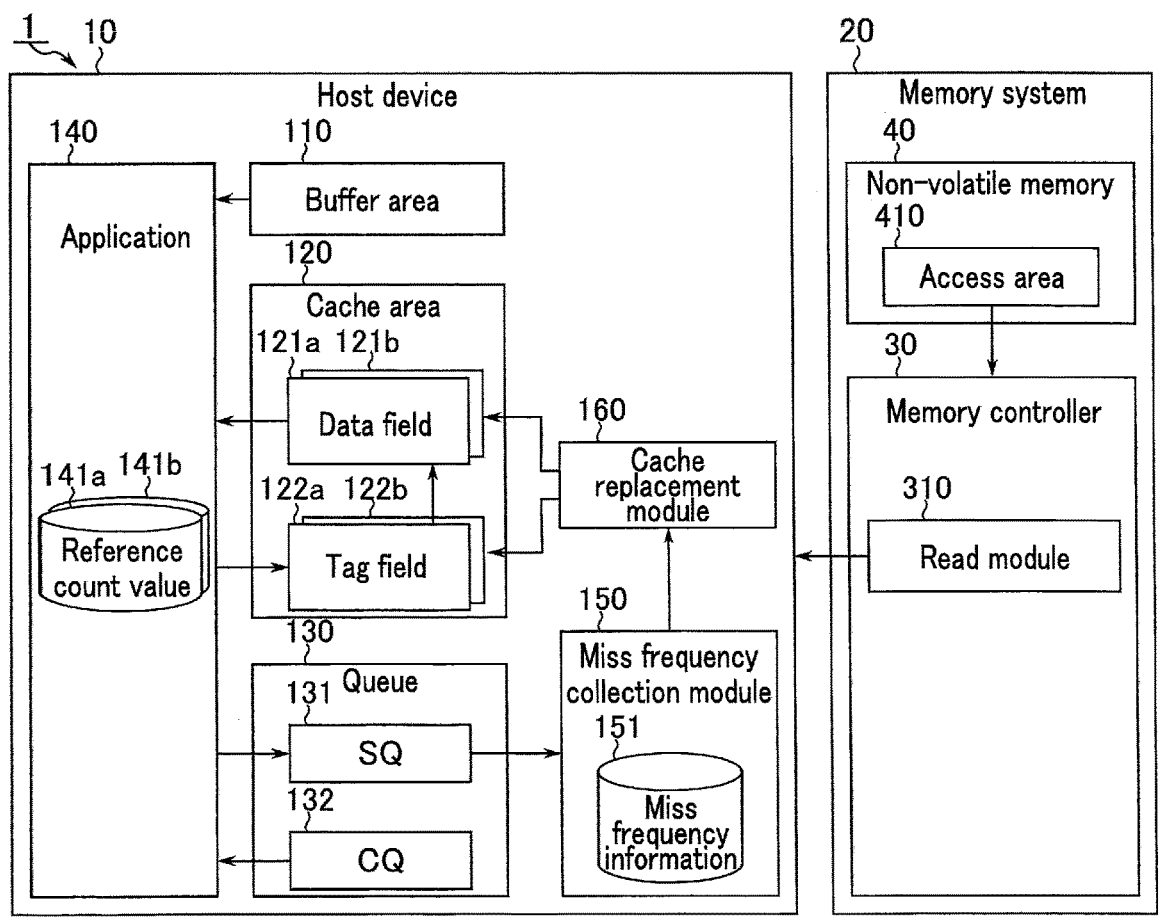
FIG. 2 is a block diagram illustrating an example of a functional configuration of the information processing system according to the first embodiment.

FIG. 2 is a block diagram illustrating a functional configuration of the information processing system according to the first embodiment.

The host device 10 functions as a buffer area 110, a cache area 120, a queue 130, an application 140, a miss frequency collection module 150, and a cache replacement module 160. The memory controller 30 functions as a read module 310. The non-volatile memory 40 functions as an access area 410.

The buffer area 110 is, for example, a memory area that functions as a direct memory access (DMA) buffer in the host memory 12. In the buffer area 110, for example, data output from the memory system 20 in response to a read request is temporarily stored.

The cache area 120 is, for example, a memory area that functions as a software cache in the host memory 12. The cache area 120 stores, for example, information regarding data to be cached over the medium to long term (that is, the access frequency is high in the medium to long term) among data stored in the access area 410. The cache area 120 includes data fields 121a and 121b and tag fields 122a and 122b.

In the data fields 121a and 121b, entities of the data to be cached are stored. Data fields 121a and 121b are associated with tag fields 122a and 122b, respectively. The tag fields 122a and 122b store information for searching the data stored in the data fields 121a and 121b, respectively. The data structure of the data field 121a and the tag field 122a is equivalent to the data structure of the data field 121b and the tag field 122b. Details of the data structure in the cache area 120 will be described later.

The queue 130 includes an SQ 131 and a CQ 132. The SQ 131 is a submission queue. The SQ 131 stores, for example, various requests (for example, a read request) to the memory system 20. The CQ 132 is a completion queue. The CQ 132 stores results of various requests ended by the memory system 20. For example, the CQ 132 stores a pointer indicating an address of a storage destination of data output from the memory system 20 in response to the read request.

The application 140 is a software program executed by the processor 11. For example, a multithreaded execution is implemented in the application 140. The application 140 determines whether or not data in the access destination (access target data) is stored in the cache area 120 according to the occurrence of the read access processing. The processing of determining whether or not the access target data is stored in the cache area 120 is also referred to as a lookup processing. That is, the application 140 performs the lookup of the cache area 120 when the read access processing is occurred. When the access target data is stored in the cache area 120 as the result of the lookup, the application 140 accesses the access target data in the data field 121 of the cache area 120. When the access target data is not stored in the cache area 120, the application 140 causes the read request to be stored in the SQ 131. The application 140 accesses the data output from the memory system 20 as a result of the read request based on the pointer stored in the CQ 132. The data output from the memory system 20 is stored in the buffer area 110, for example.

In addition, the application 140 stores reference count values 141a and 141b. The reference count value 141a and 141b may be stored in and managed by the cache area 120. The reference count value 141a is a value of a counter indicating how many threads of the application 140 are accessing the data field 121a and the tag field 122a of the cache area 120. The reference count value 141b is a value of a counter indicating how many threads of the application 140 are accessing the data field 121b and the tag field 122b of the cache area 120.

In the following description, a state in which the access target data is stored in the cache area is also referred to as a "cache hit". A state in which the access target data is not stored in the cache area is also referred to as a "cache miss".

Note that the read access processing is performed on any one of a set of the data field 121a and the tag field 122a and a set of the data field 121b and the tag field 122b. In the following description, a set of the data field 121a and the tag field 122a or a set of the data field 121b and the tag field 122b, on which the read access processing is about to be executed, is referred to as a "cache area 120 in an active state". A set of the data field 121a and the tag field 122a or a set of the data field 121b and the tag field 122b, on which the read access processing is not executed in the application 140, is referred to as a "cache area 120 in an inactive state". In addition, the reference count value 141a or 141b corresponding to the cache area 120 in an active state is referred to as "reference count value 141 in an active state". The reference count value 141a or 141b corresponding to the cache area 120 in an inactive state is referred to as "reference count value 141 in an inactive state".

The miss frequency collection module 150 is a module that executes miss frequency collection processing. The miss frequency collection processing is processing of collecting a frequency (miss frequency) at which a cache miss occurs in the read access processing in association with the access area 410. For example, every time the first period elapses, the miss frequency collection module 150 may count the number of read requests stored in the SQ 131 for each address of access target (access destination). The first period is, for example, 10 milliseconds or less. In this case, the miss frequency collection processing is executed asynchronously with the read access processing (lookup processing). For example, every time the number of cache misses reaches the first number, the miss frequency collection module 150 may count the number of read requests stored in the SQ 131 for each address of access target. The first number is, for example, 128 or less. In this case, the miss frequency collection processing is executed synchronously with the read access processing (lookup processing). The miss frequency may be reset before the miss frequency collection processing is executed, but the miss frequency is not necessarily reset. In a case where the miss frequency is not reset before the miss frequency collection processing is executed, the miss frequency collection module 150 may set, for example, a value obtained by uniformly halving the already collected miss frequency as a new miss frequency, and accumulate the collected miss frequency. The miss frequency collection module 150 stores the collected miss frequency as miss frequency information 151.

The miss frequency collection module 150 may include a bloom filter, a count-min sketch (CM sketch), and a map structure. The bloom filter is a data structure that can probabilistically determine whether or not a miss frequency occurs in a Boolean format for the given access target. The CM sketch is a data structure that can probabilistically determine the number of occurrences of misses in integer form for the given access target. The map structure is a data structure that determines the number of occurrences of misses in an integer format for the given access target. With the above configuration, the miss frequency collection module 150 selectively calculates the access target having a high miss frequency with high accuracy while probabilistically calculating the access target having a low miss frequency. As a result, the miss frequency collection module 150 can operate with fewer memory resources than when precisely collecting all miss frequencies.

The cache replacement module 160 is a module that performs a cache replacement processing. The cache replacement processing is processing of replacing data stored in the cache area 120 in an inactive state with data having a high miss frequency. For example, the cache replacement module 160 may execute the cache replacement processing every time a second period longer than the first period elapses. The second period is, for example, several hundred milliseconds. In this case, the cache replacement processing is executed asynchronously with the read access processing. For example, the cache replacement module 160 may execute the cache replacement processing every time the number of cache misses reaches a second number larger than the first number. The second number is, for example, 1024. In this case, the cache replacement processing may be executed synchronously with the read access processing. A timer that counts up to the second period and a counter that counts up to the second number are reset each time the cache replacement processing is executed.

In the cache replacement processing, the cache replacement module 160 determines which data has a high miss frequency among the data stored in the memory system based on the miss frequency information 151. For example, the cache replacement module 160 determines data having a cache miss count equal to or greater than a threshold among the data stored in the memory system 20 as data having a high miss frequency. Furthermore, the cache replacement module 160 may determine the top N pieces of data having a large number of cache misses among the data stored in the memory system 20 as data having a high miss frequency (N is a natural number). In the following description, data having a high miss frequency determined by the cache replacement module 160 is called as "replacement target data".

The cache replacement module 160 randomly determines whether or not to replace the data stored in the cache area 120 with the data determined to have a high miss frequency. Then, in a case where it is determined to replace the data, the cache replacement module 160 replaces the data stored in the cache area 120 in an inactive state with the data having a high miss frequency. If it is determined not to replace the data, the cache replacement module 160 does not replace the data. Note that the cache replacement module 160 may unconditionally replace the data stored in the cache area 120 with the data determined to have a high miss frequency.

The read module 310 is a module that executes read processing in response to a read request. Upon receiving the read request, the read module 310 reads the access target data from the non-volatile memory 40 via the memory bus MB. Then, the read module 310 outputs the access target data read from the non-volatile memory 40 to the host device 10 via the host bus HB. The output access target data is temporarily stored in the buffer area 110, for example.

The access area 410 is a memory area for storing data in a non-volatile manner in the non-volatile memory 40. In the access area 410, data to be access target in the read access processing is stored in a non-volatile manner.

1.1.3 Configuration of Access Area

FIG. 3 is a diagram illustrating an example of a configuration of an access area of the information processing system according to the first embodiment. As illustrated in FIG. 3, the access area 410 is divided into a plurality of sub-areas. Data DAT to be access target is stored in each of the plurality of sub-areas.

Specifically, for example, each of the plurality of sub-areas in the access area 410 is associated with one tag number of x tag numbers and one group of y groups (each of x and y is an integer of 2 or more). In the example of FIG. 3, in an arbitrary combination of i of 1 or more and x or less and j of 1 or more and y or less, a case where data DAT ((i−1)y+j) is stored is indicated in a sub-area associated with a set of a tag number "i" and a group "j".

With the above configuration, different tag numbers are allocated to x sub areas associated with the same group among a plurality of sub areas in the access area 410.

1.1.4 Configuration of Cache Area

FIG. 4 is a diagram illustrating an example of a configuration of a cache area of the information processing system according to the first embodiment. FIG. 4 illustrates an example of a configuration of a set of the data field 121a and the tag field 122a. Note that the configuration of the set of the data field 121b and the tag field 122b is equivalent to the configuration of the set of the data field 121a and the tag field 122a, and thus the description will be omitted. However, the set of the data field 121a and the tag field 122a can be different from the set of the data field 121b and the tag field 122b.

A set of the data field 121a and the tag field 122a is divided into y sub-areas. The y sub-areas are each associated with a group "1" to a group "y". That is, a sub-area of a set of the data field 121a and the tag field 122a associated with the group "j" is allocated as a cache area for x sub-areas associated with the group "j" in the access area 410.

The cache data CDAT is stored in a sub-area of the data field 121a. In a sub-area of the tag field 122a, a set of a tag number and a valid flag is stored.

The valid flag of the tag field 122a indicates whether or not valid cache data CDAT is stored in the corresponding data field 121a. Specifically, for example, when the valid flag V2 of the tag field 122a associated with the group "2" is "true", the cache data CDAT2 of the data field 121a associated with the group "2" is valid. When the valid flag V3 of the tag field 122a associated with the group "3" is "false", the cache data CDAT3 of the data field 121a associated with the group "3" is invalid.

The tag number of the tag field 122a indicates to which tag number the cache data CDAT stored in the data field 121a is allocated in the access area 410. Specifically, for example, when the tag number T1 of the tag field 122a associated with the group "1" is "3", the cache data CDAT1 stored in the data field 121a associated with the group "1" is data DAT (2y+1). When the tag number Ty of the tag field 122a associated with the group "y" is "x", the cache data CDATy stored in the data field 121a associated with the group "y" is data DAT (xy).

With the above configuration, it is possible to specify which sub-area of the access area 410 the cache data CDAT stored in the cache area 120 corresponds to. Such a data structure in the cache area 120 is also referred to as a direct-mapped cache structure. In the examples of FIGS. 3 and 4, the case where the sub-area is identified by a set of a tag number and a group has been described, but the present invention is not limited thereto. For example, the tag number and the group may be calculated as an output when the address of the access area 410 is input to the hash function. Moreover, each data is not limited to a fixed length, and may store variable-length data.

1.2 Operation

Next, an operation in the information processing system according to the first embodiment will be described.

1.2.1 Read Access Processing

Figure 5:
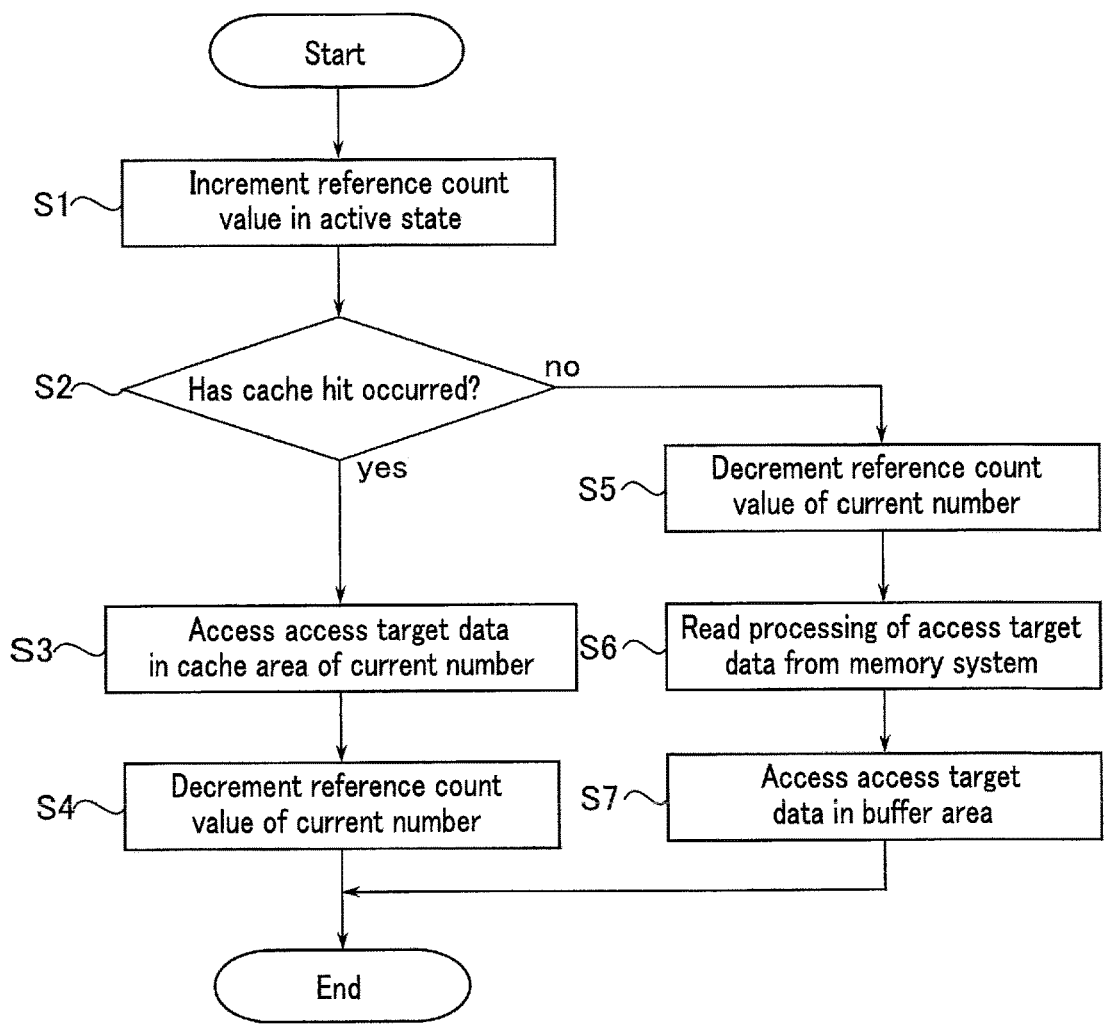
FIG. 5 is a flowchart illustrating an example of read access processing in an application of the information processing system according to the first embodiment.

FIG. 5 is a flowchart illustrating an example of read access processing in an application of the information processing system according to the first embodiment.

When a read access occurs (start), the application 140 increments the reference count value 141 in an active state (S1). More specifically, the application 140 acquires the cache number (current number) of the cache area 120 in an active state. Then, the application 140 increments the reference count value 141 of the current number.

The application 140 determines whether or not the access target data is stored in the cache area 120 of the current number. In other words, the application 140 determines whether or not a cache hit has occurred (S2).

When a cache hit occurs (S2; yes), the application 140 accesses the access target data stored in the data field 121 of the cache area 120 of the current number (S3). As a result, the application 140 uses the access target data. Note that switching from the active state to the inactive state of the cache area 120 is executed asynchronously with the application 140. Therefore, the cache area 120 in an active state may be switched to the inactive state, for example, at the time of the processing of S1 and at the time of the processing of S3. Therefore, the application 140 acquires the current number at the time of the processing of S1, and stores the current number until the read access processing ends.

After the processing of S3, the application 140 decrements the reference count value 141 of the current number (S4).

When a cache miss occurs (S2; no), the application 140 decrements the reference count value 141 of the current number (S5).

The application 140 causes the memory system 20 to execute a read processing of the access target data (S6). The access target data output from the memory system by the read processing in S6 is stored in the buffer area 110.

The application 140 accesses the access target data stored in the buffer area 110 (S7). As a result, the application 140 uses the access target data.

When the processing of S4 or the processing of S7 ends, the read access processing ends (end).

As described above, the read access processing is divided into processing of accessing the data field 121 of the cache area 120 when a cache hit occurs and processing of accessing the access area 410 when a cache miss occurs. Therefore, the frequency at which the read access processing occurs is the sum of the frequency at which the cache hit occurs (that is, the frequency of access to the data field 121 of the cache area 120) and the frequency at which the cache miss occurs (that is, the frequency of access to the access area 410).

1.2.2 Read Processing

Figure 6:
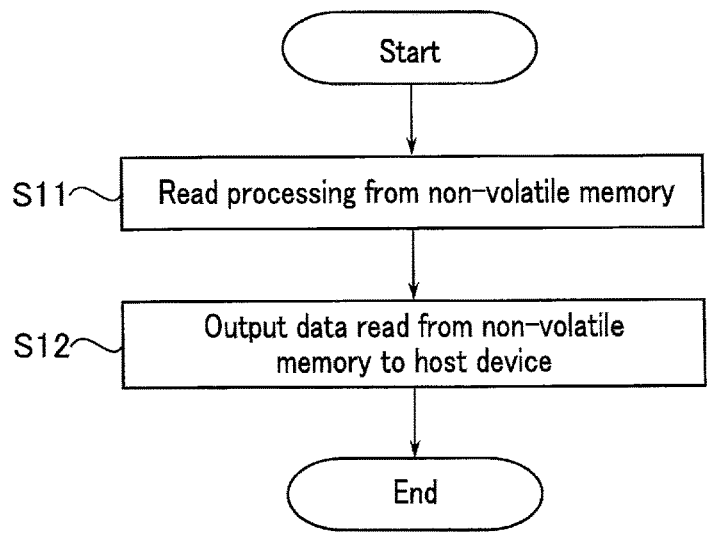
FIG. 6 is a flowchart illustrating an example of a read processing in a read module of the information processing system according to the first embodiment.

FIG. 6 is a flowchart illustrating an example of a read module of the information processing system according to the first embodiment. The processing of S11 and S12 illustrated in FIG. 6 corresponds to the processing of S6 in FIG. 5.

When the read request is stored in the SQ 131 (start), the read module 310 executes read processing of the access target data from the access area 410 in the non-volatile memory 40 (S11).

The read module 310 outputs the access target data read from the access area 410 by the processing of S11 to the host device 10 (S12). The data output to the host device 10 is stored in the buffer area 110.

When the processing of S12 ends, the read processing ends (end).

1.2.3 Miss Frequency Collection Processing

Figure 7:
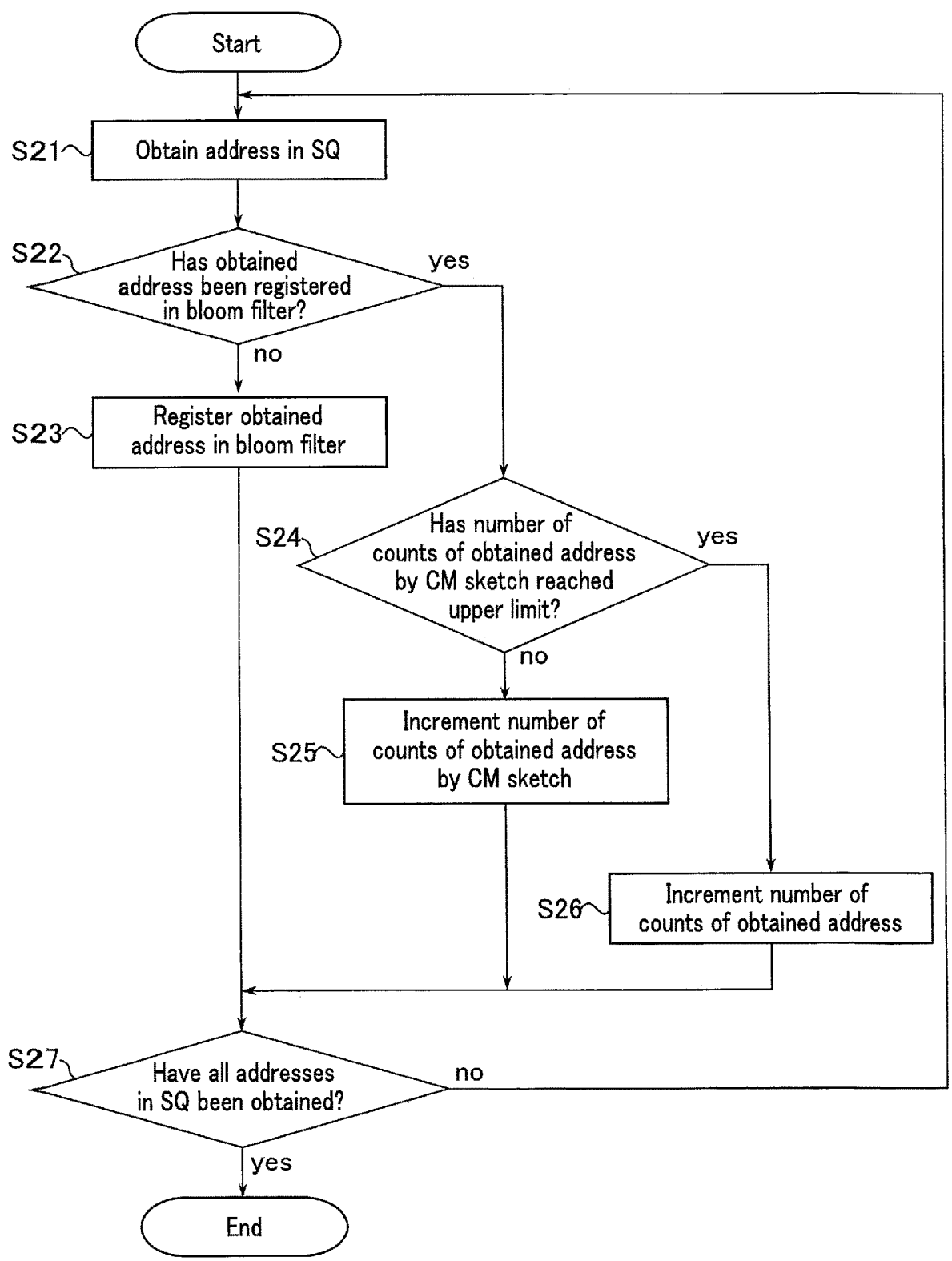
FIG. 7 is a flowchart illustrating an example of miss frequency collection processing in a miss frequency collection module of the information processing system according to the first embodiment.

FIG. 7 is a flowchart illustrating an example of miss frequency collection processing in the miss frequency collection module of the information processing system according to the first embodiment.

When the first period elapses or the number of cache misses reaches the first number (start), the miss frequency collection module 150 obtains an address of access target included in the read request in the SQ 131 (S21).

The miss frequency collection module 150 determines whether or not the address obtained in the processing of S21 has been registered in the bloom filter (S22).

When the obtained address is not registered in the bloom filter (S22; no), the miss frequency collection module 150 registers the address obtained in the processing of S21 in the bloom filter (S23). As a result, information for probabilistically determining whether or not a cache miss has already occurred in a boolean format for each address in the access area 410 is stored in the miss frequency information 151. Note that a case where it is determined that the obtained address has been registered in the bloom filter includes a case of a false positive. Therefore, even when the obtained address has not been registered in the bloom filter, the miss frequency collection module 150 may erroneously determine that the address has been registered in the bloom filter.

When the obtained address is already registered in the bloom filter (S22; yes), the miss frequency collection module 150 determines whether or not the number of counts of the address obtained in the processing of S21 by the CM sketch has reached the upper limit (S24).

When the number of counts of the obtained address by the CM sketch does not reach the upper limit (S24; no), the miss frequency collection module 150 increments the number of counts by the CM sketch of the address obtained in the processing of S21 (S25). As a result, information for probabilistically determining how many cache misses has occurred in an integer format for each address in the access area 410 is stored in the miss frequency information 151.

When the number of counts of the obtained address by the CM sketch reaches the upper limit (S24; yes), the miss frequency collection module 150 increments the exact number of counts of the address obtained in the processing of S21 (S26).

Note that a case where it is determined that the number of counts by the CM sketch of the obtained address has reached the upper limit includes some errors with probability. Therefore, even when the number of counts does not reach the upper limit in a case where the miss frequencies are collected precisely, the miss frequency collection module 150 may erroneously determine that the number of counts by the CM sketch has reached the upper limit.

After the processing of S23, the processing of S25, or the processing of S26, the miss frequency collection module 150 determines whether or not addresses included in all read requests in the SQ 131 have been selected (S27).

When the addresses included in all the read requests in the SQ 131 are not obtained (S27; no), the miss frequency collection module 150 obtains an address of access target included in the read request in the SQ 131 (S21). Subsequently, the subsequent processing of S22 to 27 is executed. As a result, the processing of S21 to S27 is repeated until addresses included in all read requests in the SQ 131 are obtained.

When the addresses included in all the read requests in the SQ 131 are obtained (S27; yes), the miss frequency collection processing ends (end).

1.2.4 Cache Replacement Processing

Figure 8:
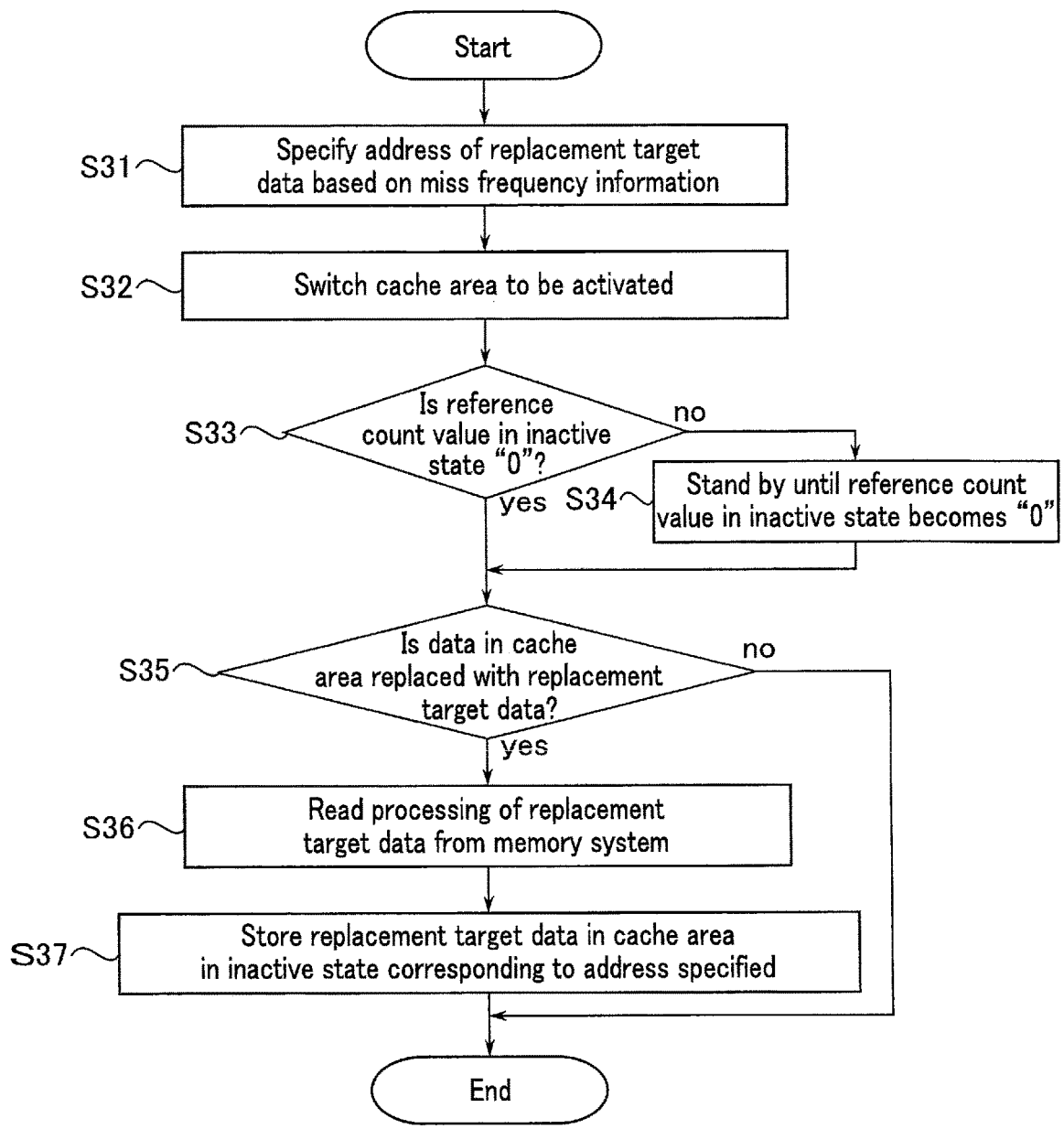
FIG. 8 is a flowchart illustrating an example of cache replacement processing in a cache replacement module of the information processing system according to the first embodiment.

FIG. 8 is a flowchart illustrating an example of cache replacement processing in the cache replacement module of the information processing system according to the first embodiment.

When the second period elapses or the number of cache misses reaches the second number (start), the cache replacement module 160 specifies the addresses of the replacement target data from the access area 410 based on the miss frequency information 151 (S31).

The cache replacement module 160 switches the cache area 120 to be activated (S32). Specifically, when the set of the data field 121*a* and the tag field 122*a* is in an active state, the data field 121*a* and the tag field 122*a* are turned into the inactive state, and the data field 121*b* and the tag field 122*b* are turned into the active state. When the set of the data field 121*b* and the tag field 122*b* is in an active state, the data field 121*b* and the tag field 122*b* are turned into the inactive state, and the data field 121*a* and the tag field 122*a* are turned into the active state.

The cache replacement module 160 determines whether or not the reference count value 141 in an inactive state is "0" (S33).

When the reference count value 141 in an inactive state is not "0" (S33; no), the cache replacement module 160 stands by until the reference count value 141 in an inactive state becomes "0" (S34).

When the reference count value 141 in an inactive state is "0" (S33; yes), or after the processing of S34, the cache replacement module 160 determines whether or not to replace the data in the cache area 120 with the addresses specified in the processing of S31 (S35). For example, the cache replacement module 160 randomly determines whether or not to replace the data in the cache area 120. When unconditionally replacing the data in the cache area 120, in the processing of S35, the cache replacement module 160 determines to replace the data in the cache area 120 (S35; yes).

When it is determined that the data in the cache area 120 is to be replaced (S35; yes), the cache replacement module 160 causes the memory system 20 to execute read processing of the replacement target data (S36).

The cache replacement module 160 causes the replacement target data to be stored in the cache area 120 in an inactive state corresponding to the address specified in the processing of S31 (S37). Accordingly, the data stored currently in the cache area 120 in an inactive state corresponding to the address specified in the processing of S31 is evicted.

When it is determined that the data in the cache area 120 is not to be replaced (S35; no) or the processing of S37 ends, the cache replacement processing ends (end). Note that, in the cache replacement processing described above, the processing of S31 may be executed with any order if it ends before the processing of S35. Note that, in a case where a plurality of addresses is specified in the processing of S31, the cache replacement module 160 performs the processing of S35 to S37 for each specified address.

1.2.5 Relationship Between Frequencies of Various Processing

Figure 9:
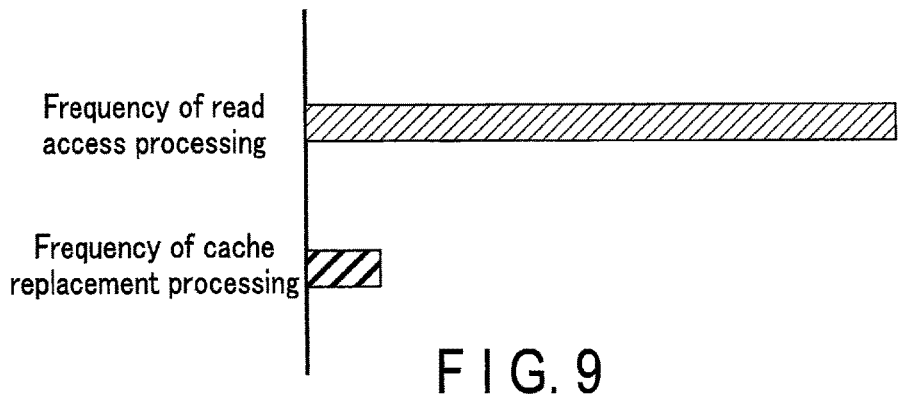
FIG. 9 is a diagram illustrating a relationship between a frequency of a read access processing and a frequency of the cache replacement processing in the information processing system according to the first embodiment.

FIG. 9 is a diagram illustrating a relationship between a frequency of a read access processing and a frequency of the cache replacement processing in the information processing system according to the first embodiment.

As described above, the cache replacement processing can be executed asynchronously or synchronously with the read access processing. Regardless of whether the cache replacement processing is executed asynchronously or synchronously with the read access processing, the overhead of the cache replacement processing is set sufficiently low with respect to the CPU processing load of the processor 11 in the read access processing. In a case where the cache replacement processing is executed synchronously with the read access processing, the frequency of cache replacement processing can be lower than the frequency of the read access processing as shown in FIG. 9. In a case where the cache replacement processing is executed asynchronously with the read access processing, the frequency of cache replacement processing may be lower than the frequency of the read access processing as shown in FIG. 9 by setting the second period of the cache replacement processing to be sufficiently long.

1.3 Effects According to First Embodiment

According to the first embodiment, the cache replacement module 160 executes the cache replacement processing at a frequency lower than the frequency of the read access processing (that is, the frequency at which it is determined whether or not the data to be read is cached in the cache area 120.) in many cases. Specifically, the cache replacement module 160 performs the cache replacement processing when the number of times of cache misses in the read access processing reaches the second number. Alternatively, the cache replacement module 160 executes the cache replacement processing when the second period has elapsed from the cache replacement processing executed immediately before. As a result, it is not necessarily to execute the cache data CDAT replacement processing every time the read access processing occurs. Therefore, it is possible to suppress an increase in the CPU processing load of the processor 11 in the read access processing.

Incidentally, the CPU processing load of the processor 11 in the read access processing includes a load associated with the software cache and a load associated with input and output of data from the memory system 20 when a cache miss occurs. When there are many accesses to the data stored in the memory system 20 (specifically, for example, in a case where the frequency of read accesses including both cases of a cache hit and a cache miss in one thread exceeds 5 million times per second (5M Read Per Second)), the load is large. In a case where software optimization is performed to reduce a load associated with input and output of data due to a high input and output per second (IOPS) of the memory system 20, there is a possibility that the load associated with the software cache can be significant.

According to the first embodiment, the cache replacement processing is executed at a frequency lower than the miss frequency in many cases. As a result, the CPU processing load of the processor 11 associated with the software cache can be reduced as compared with a case where the cache replacement processing is executed each time a cache miss occurs. Therefore, even when the IOPS of the memory system 20 is sufficiently high, the load associated with the software cache can be sufficiently reduced.

In addition, the frequency of the cache replacement processing is lower than the miss frequency in many cases. As a result, the cache replacement processing is suitable for caching data that is often used in a medium to long term period (for example, several hundred milliseconds). Therefore, the frequency of data replacement for the cache area 120 can be reduced in a medium to long term period.

The miss frequency collection module 150 executes the miss frequency collection processing. Specifically, the miss frequency collection module 150 executes the miss frequency collection processing when the number of cache misses in the read access processing reaches the first number, which is smaller than the second number. Alternatively, the miss frequency collection module 150 executes the miss frequency collection processing when the first period, which is shorter than the second period, elapses from the miss frequency collection processing executed immediately before. As a result, it is not necessarily to execute the cache data CDAT replacement processing every time the read access processing occurs. Therefore, it is possible to suppress an increase in the CPU processing load of the processor 11 in the read access processing.

In addition, the cache replacement module 160 randomly determines whether or not to replace the data in the cache area 120 with the replacement target data in the cache replacement processing. As a result, it is possible to determine whether or not to replace the data in the cache area 120 by processing with a small load. In addition, since the data in the cache area 120 is randomly replaced, it is possible to prevent specific data from continuing to remain in the cache area 120.

2. Second Embodiment

Next, an information processing system according to a second embodiment will be described. The second embodiment is different from the first embodiment in that whether or not to replace the data in a cache area 120 with replacement target data in cache replacement processing is determined based on the access frequency of the data in the cache area 120. In the following description, description of configurations and operations equivalent to those of the first embodiment will be omitted, and configurations and operations different from those of the first embodiment will be mainly described.

2.1 Functional Configuration of Information Processing System

Figures 10, 11:
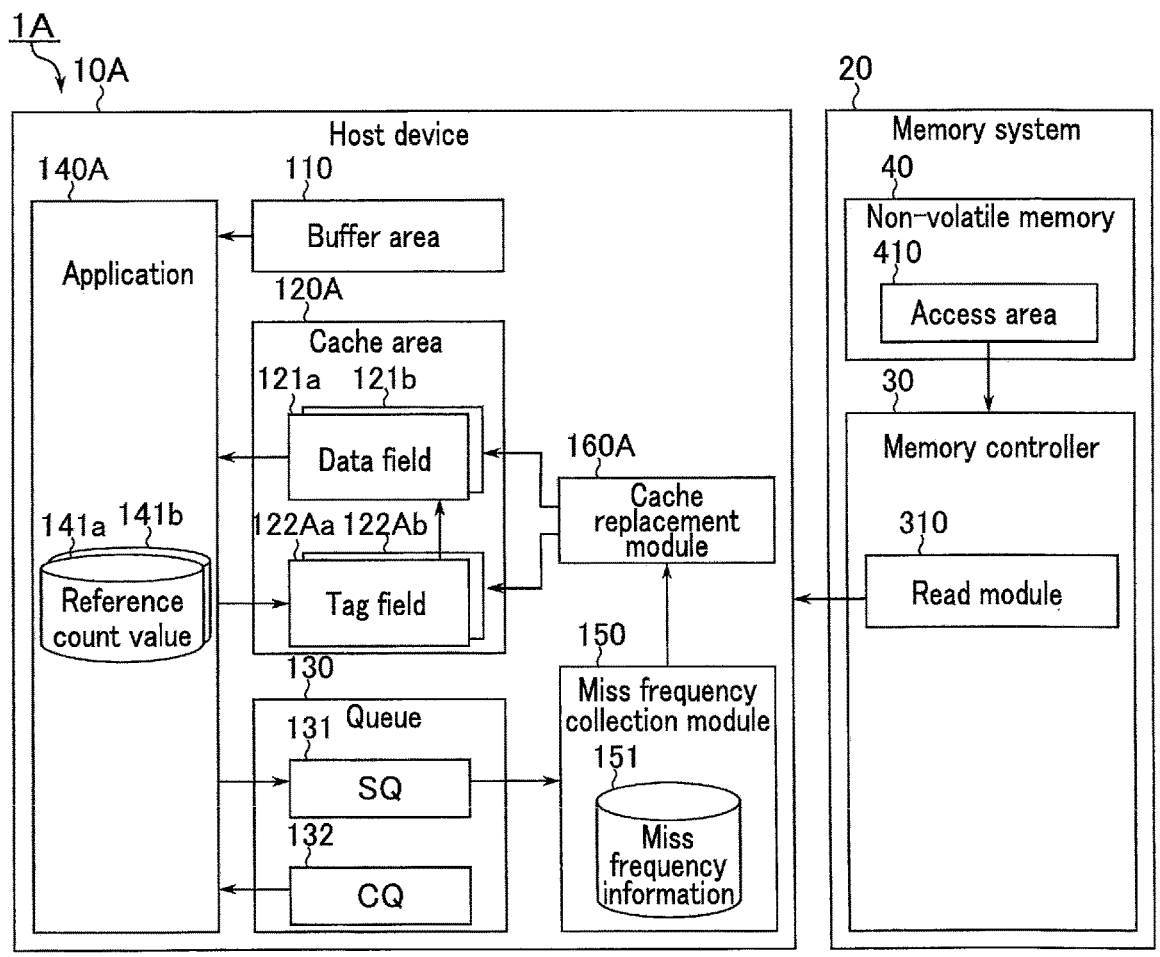
FIG. 10 is a block diagram illustrating an example of a functional configuration of an information processing system according to a second embodiment.
FIG. 11 is a diagram illustrating an example of a configuration of a cache area and an access frequency information of the information processing system according to the second embodiment.

FIG. 10 is a block diagram illustrating a functional configuration of the information processing system according to the second embodiment. FIG. 10 corresponds to FIG. 2 in the first embodiment.

An information processing system 1A includes a host device 10A and a memory system 20. Since the functional configuration of the memory system 20 is equivalent to that of the first embodiment, the description will be omitted.

The host device 10A functions as a buffer area 110, a cache area 120A, a queue 130, an application 140A, a miss frequency collection module 150, and a cache replacement module 160A. The functional configurations of the buffer area 110, the queue 130, and the miss frequency collection module 150 are equivalent to those of the first embodiment, and thus, the description will be omitted.

The cache area 120A includes data fields 121a and 121b and tag fields 122A a and 122Ab. The configurations of the data fields 121a and 121b are equivalent to those of the first embodiment. Data fields 121a and 121b are associated with tag fields 122Aa and 122Ab, respectively. The tag fields 122Aa and 122Ab store information for searching the data stored in the data fields 121a and 121b, respectively. The data structure of the data field 121a and the tag field 122Aa is equivalent to the data structure of the data field 121b and the tag field 122Ab. Details of the data structure in the cache area 120A will be described later.

In the cache area 120A, the frequency at which data is read from the cache area 120A in the read access processing is stored for each address as access frequency information 142. Specifically, in the cache area 120A, an approximate frequency at which a cache hit occurs is stored for each address as the access frequency information 142. The access frequency is, for example, the number of accesses per unit time. The access frequency information 142 may be initialized by, for example, miss frequency information 151. The access frequency information 142 may be reset each time the cache replacement processing is executed, or the access frequency information 142 is not necessarily reset. In a case where the access frequency information 142 is not reset, the access frequency information 142 is not necessarily updated or may be updated after being initialized, for example. In a case where the access frequency information 142 is updated, the access frequency information 142 may be halved at every certain time interval, or may be updated by the access count value 143. The access count value 143 is a value of a counter indicating the number of times a cache hit has occurred for data that can be an access count target in the cache area 120A.

The cache replacement module 160A determines, based on the access frequency information 142, whether or not to replace the data stored in the cache area 120A with the data determined to have a high miss frequency. Specifically, the cache replacement module 160A compares the miss frequency of the data determined to have a high miss frequency with the access frequency associated with the address of the cache area 120A that replaces the data. As a result of the comparison, in a case where the miss frequency is higher than the access frequency, the cache replacement module 160A replaces the data stored in the cache area 120A in an inactive state with the data having a high miss frequency. If the miss frequency is lower than the access frequency, the cache replacement module 160A does not replace the data.

2.2 Configuration of Cache Area

FIG. 11 is a diagram illustrating an example of a configuration of a cache area and an access frequency of the information processing system according to the second embodiment. FIG. 11 corresponds to FIG. 4 in the first embodiment. FIG. 11 illustrates an example of a configuration of a set of the data field 121a and the tag field 122Aa. Note that the configuration of the set of the data field 121b and the tag field 122Ab is equivalent to the configuration of the set of the data field 121a and the tag field 122Aa, and thus the description will be omitted.

A set of the data field 121a and the tag field 122Aa is divided into y sub-areas. The y sub-areas are each associated with a group "1" to a group "y".

In a sub area of the tag field 122Aa, a set of a tag number, a valid flag, and an access count flag is stored. The access count flag of the tag field 122Aa indicates whether or not the access count value 143 is incremented when data is read from the corresponding data field 121a. When the access count flag E1 of the tag field 122Aa associated with the group "1" is "true", the access frequency information A1 corresponding to the cache data CDAT1 may be updated by the access count value. In a case where the access count flag E1 is "false", the access frequency information A1 corresponding to the cache data CDAT1 is not updated by the access count value.

For example, the access count flag is periodically switched between "true" and "false". As a result, it is possible to control the number of groups for which the access count value is calculated in a certain period. Therefore, the management load of the access frequency information 142 by the application 140A can be reduced.

2.3 Read Access Processing

Figure 12:
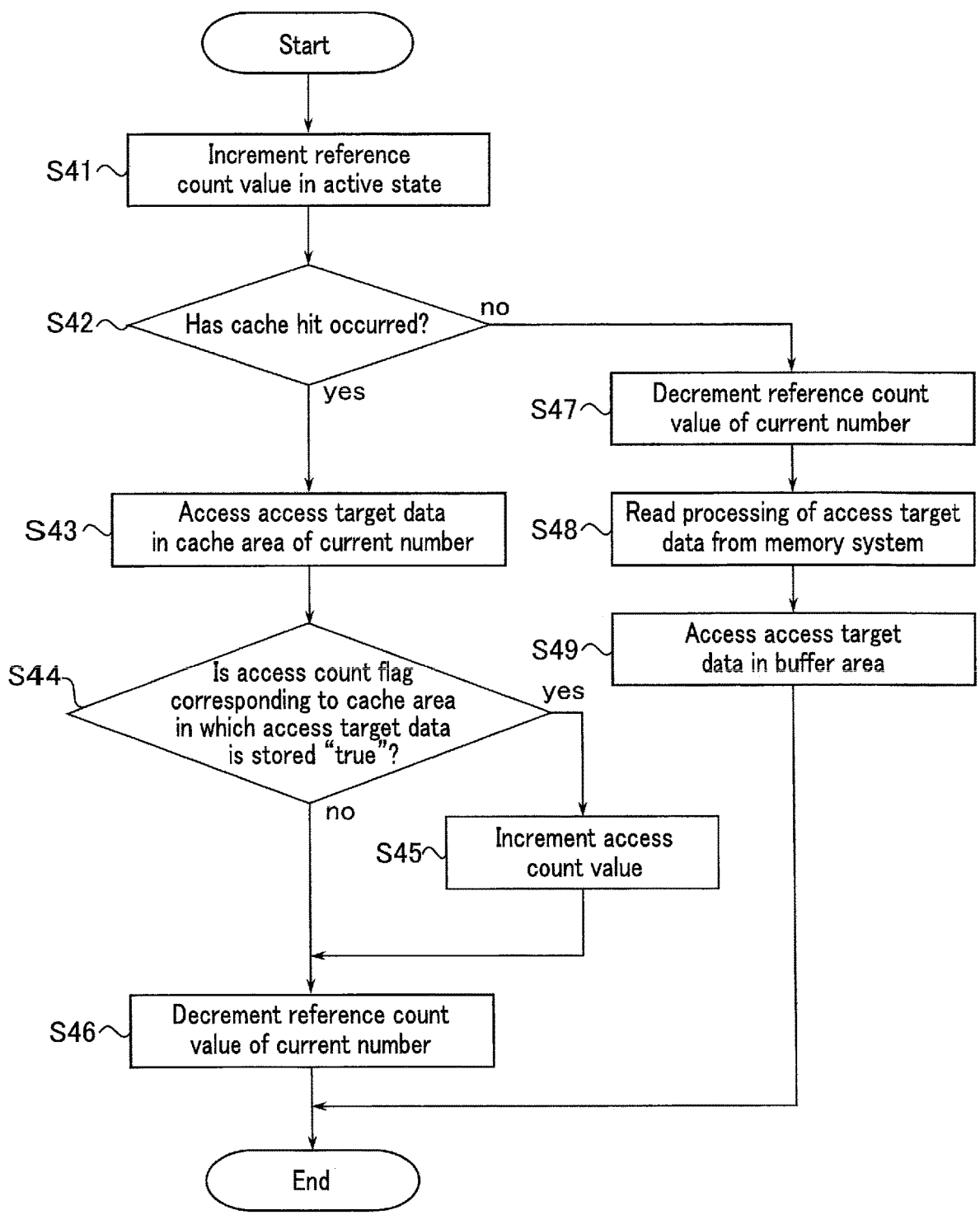
FIG. 12 is a flowchart illustrating an example of read access processing in an application of the information processing system according to the second embodiment.

FIG. 12 is a flowchart illustrating an example of read access processing in an application of the information processing system according to the second embodiment. FIG. 12 corresponds to FIG. 5 in the first embodiment.

When a read access occurs (start), the application 140A increments the reference count value 141 in an active state (S41). More specifically, the application 140A acquires the cache number (current number) of the cache area 120A in an active state. Then, the application 140A increments the reference count value 141 of the current number.

The application 140A determines whether or not a cache hit has occurred (S42).

When a cache hit occurs (S42; yes), the application 140A accesses the access target data stored in the data field 121 of the cache area 120A of the current number (S43).

After the processing of S43, the application 140A determines whether or not the access count flag corresponding to the cache area 120A in which the access target data is stored is "true" (S44).

In a case where the access count flag corresponding to the cache area 120A in which the access target data is stored is "true" (S44; yes), the application 140A increments the corresponding access count value 143 (S45).

In a case where the access count flag corresponding to the cache area 120A in which the access target data is stored is "false" (S44; no), or after the processing of S45, the application 140A decrements the reference count value 141 of the current number (S46).

When a cache miss occurs (S42; no), the application 140A decrements the reference count value 141 of the current number (S47).

The application 140A causes the memory system 20 to execute a read processing of the access target data (S48). The access target data output from the memory system by the read processing in S48 is stored in the buffer area 110.

The application 140A accesses the access target data stored in the buffer area 110 (S49).

When the processing of S46 or the processing of S49 ends, the read access processing ends (end).

Note that the cache replacement module 160A updates the access count value 143 to the corresponding access frequency information 142 at every certain time interval, for example. As a result, the access frequency information 142 is appropriately updated to the latest access frequency.

2.4 Cache Replacement Processing

Figure 13:
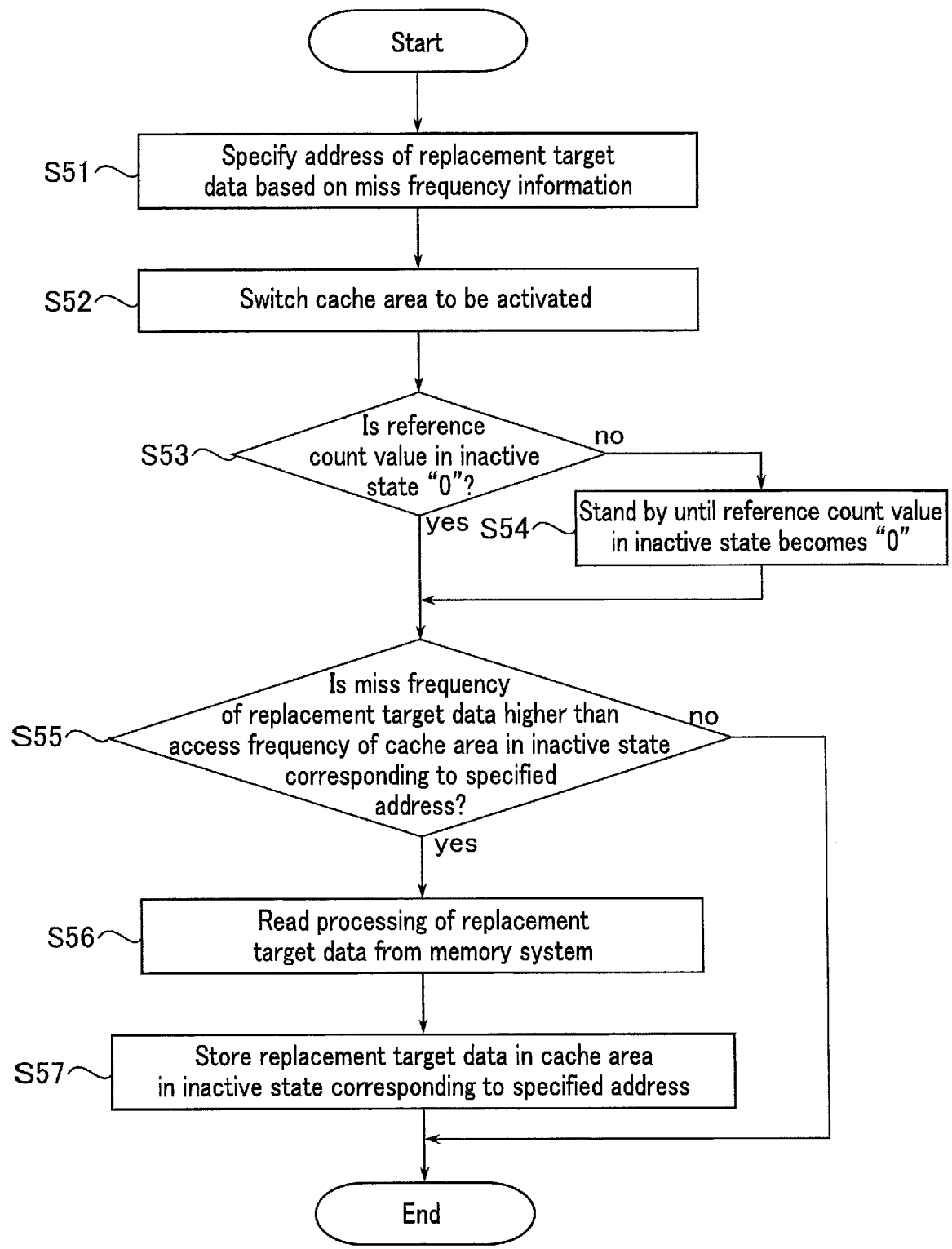
FIG. 13 is a flowchart illustrating an example of cache replacement processing in a cache replacement module of the information processing system according to the second embodiment.

FIG. 13 is a flowchart illustrating an example of cache replacement processing in a cache replacement module of the information processing system according to the second embodiment. FIG. 13 corresponds to FIG. 8 in the first embodiment.

When the second period elapses or the number of cache misses reaches the second number (start), the cache replacement module 160A specifies the address of the replacement target data from the access area 410 based on the miss frequency information 151 (S51). Specifically, for example, the cache replacement module 160A specifies the address of the access area 410 in which the data having the maximum miss frequency is stored.

The cache replacement module 160A switches the cache area 120A to be activated (552).

The cache replacement module 160A determines whether or not the reference count value 141 in an inactive state in the read access processing is "0" (S53).

When the reference count value 141 in an inactive state is not "0" (S53; no), the cache replacement module 160A stands by until the reference count value 141 in an inactive state becomes "0" (S54).

When the reference count value 141 in an inactive state is "0" (S53; yes), or after the processing of S54, the cache replacement module 160A determines whether the miss frequency of the replacement target data is higher than the access frequency of the cache area 120A in an inactive state corresponding to the address specified in the processing of S51 (S55).

In a case where the miss frequency of the replacement target data is higher than the access frequency of the cache area 120A in an inactive state corresponding to the address specified in the processing of S51 (S55; yes), the cache replacement module 160A causes the memory system 20 to execute read processing of the replacement target data (S56).

The cache replacement module 160A causes the replacement target data to be stored in the cache area 120A in an inactive state corresponding to the address specified in the processing of S51 (S57). Accordingly, the data stored up to the present in the cache area 120A in an inactive state corresponding to the address specified in the processing of S51 is evicted.

In a case where the miss frequency of the replacement target data is lower than the access frequency of the cache area 120A in an inactive state corresponding to the address specified in the processing of S51 (S55; no), or when the processing of S57 ends, the cache replacement processing ends (end).

2.5 Effects According to Second Embodiment

According to the second embodiment, in a case where the access frequency is lower than the miss frequency, the cache replacement module 160A causes the replacement target data to be stored in the cache area 120A in an inactive state. As a result, in a case where the access frequency of the data already stored in the cache area 120A is high, it is possible to suppress the data from being evicted from the cache area 120A. Therefore, it is possible to more accurately maintain a state in which data having a high access frequency in the medium to long term is cached.

3. Third Embodiment

Next, an information processing system according to a third embodiment will be described. The third embodiment is different from the first embodiment in that a cache is implemented in a memory system. In the following description, description of configurations and operations equivalent to those of the first embodiment will be omitted, and configurations and operations different from those of the first embodiment will be mainly described.

3.1 Hardware Configuration of Information Processing System

Figure 14:
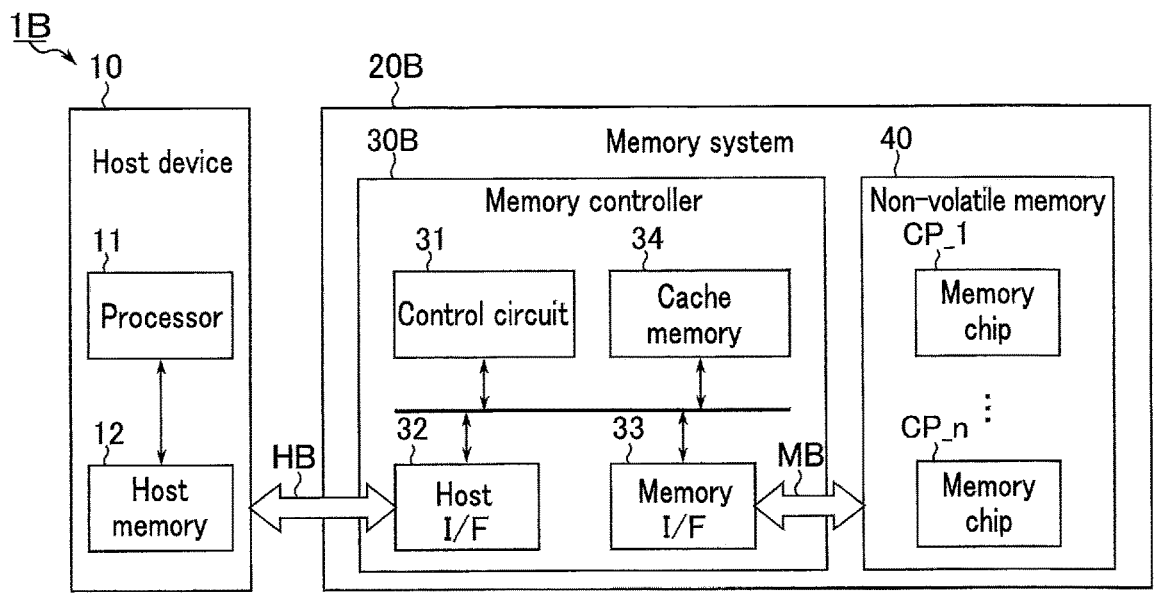
FIG. 14 is a block diagram illustrating an example of a hardware configuration of an information processing system according to a third embodiment.

FIG. 14 is a block diagram illustrating an example of a hardware configuration of the information processing system according to the third embodiment. FIG. 14 corresponds to FIG. 1 in the first embodiment.

An information processing system 1B includes a host device 10 and a memory system 20B. The memory system 20B includes a memory controller 30B and a non-volatile memory 40. Since the functional configuration of the host device 10 and the non-volatile memory 40 is equivalent to that of the first embodiment, the description will be omitted.

The memory controller 30B includes a control circuit 31, a host interface circuit 32, a memory interface circuit 33, and a cache memory 34. Since the configurations of the control circuit 31, the host interface circuit 32, and the memory interface circuit 33 are equivalent to those of the first embodiment, the description will be omitted.

The cache memory 34 is, for example, a static random access memory (SRAM) or a DRAM. The cache memory 34 is used as a memory area for temporarily storing data read from the non-volatile memory 40.

3.2 Functional Configuration of Information Processing System

Figure 15:
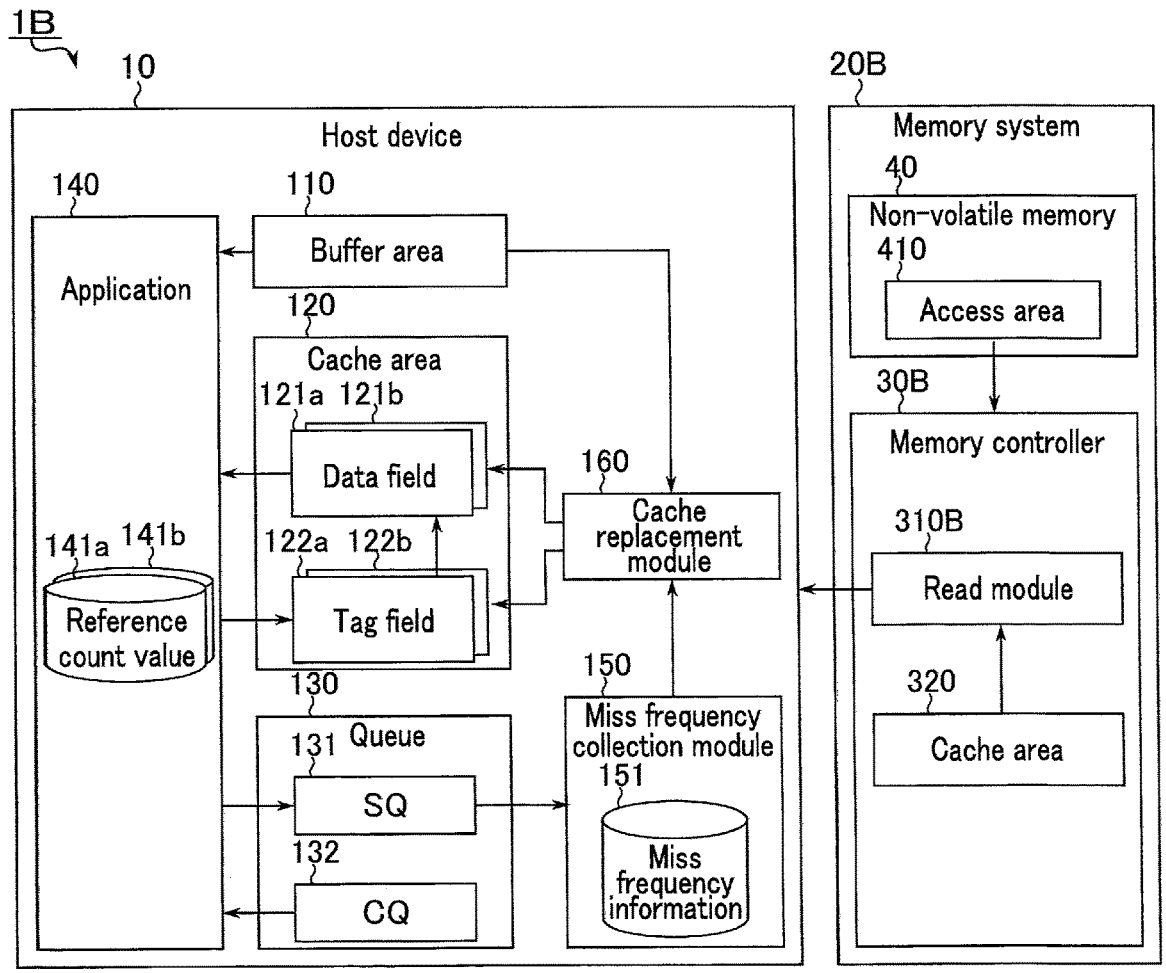
FIG. 15 is a block diagram illustrating an example of a functional configuration of the information processing system according to the third embodiment.

FIG. 15 is a block diagram illustrating a functional configuration of the information processing system according to the third embodiment. FIG. 15 corresponds to FIG. 2 in the first embodiment.

The memory controller 30B functions as a read module 310B and a cache area 320.

The cache area 320 is a memory area that functions as a cache. The cache constituting the cache area 320 may be implemented in hardware or by using software on a processor in the memory controller 30B. In the cache area 320, for example, data that is frequently accessed in a short term with respect to data stored in the cache area 120 is stored. For example, every time a cache miss occurs, data in which the cache miss occurs is refilled into the cache area 320.

When receiving the read request, the read module 310B determines whether or not the access target data is stored in the cache area 320. In a case where the access target data is stored in the cache area 320, the read module 310B outputs the access target data in the cache area 320 to the host device 10. In a case where the access target data is not stored in the cache area 320, the read module 310B reads the access target data from the non-volatile memory 40 via the memory bus MB. Then, the read module 310B outputs the access target data read from the non-volatile memory 40 to the host device 10 via the host bus HB. In addition, the read module 310B refills the access target data read from the non-volatile memory 40 into the cache area 320.

3.3 Read Processing

Figure 16:
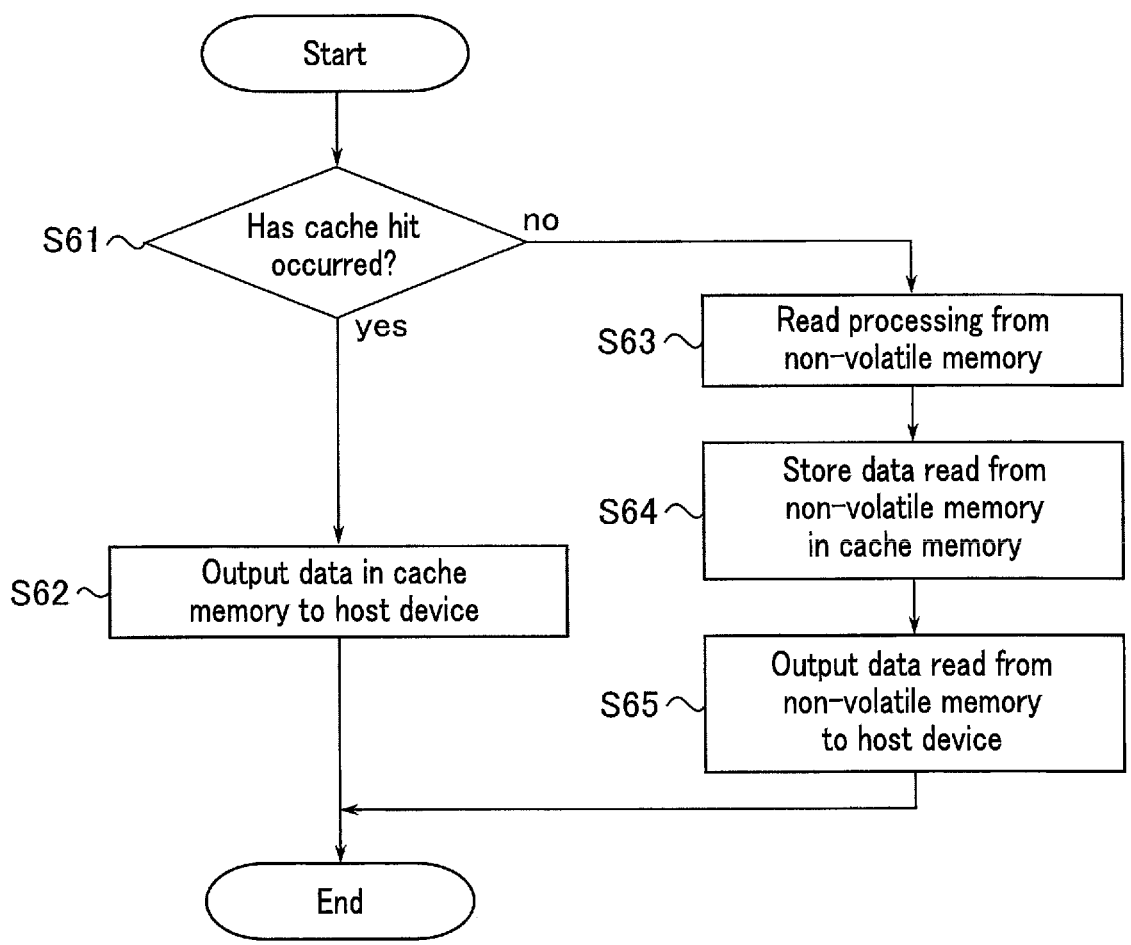
FIG. 16 is a flowchart illustrating an example of a read processing in a read module of the information processing system according to the third embodiment.

FIG. 16 is a flowchart illustrating an example of a read processing in a read module of the information processing system according to the third embodiment. FIG. 16 corresponds to FIG. 6 in the first embodiment.

When the read request is stored in the SQ 131 (start), the read module 310B determines whether or not the access target data is stored in the cache area 320. In other words, the read module 310B determines whether or not a cache hit has occurred (S61).

When a cache hit has occurred (S61; yes), the read module 310B outputs the access target data read from the cache area 320 to the host device 10 (S62).

When a cache miss occurs (S61; no), the read module 310B executes a read processing from the access target of the access area 410 (S63).

The read module 310B stores the access target data read from the access area 410 by the processing of S63 in the cache area 320 (S64).

The read module 310B outputs the access target data read from the access area 410 by the processing of S63 to the host device 10 (S65).

When the processing of S62 or the processing of S65 ends, the read processing ends (end). Additionally, the data output to the host device 10 is stored in the buffer area 110.

3.4 Effects According to Third Embodiment

According to the third embodiment, the memory controller 30B includes the cache memory 34. In the read processing, the read module 310B determines whether or not the access target data is stored in the cache area 320. As a result, even if the access target data is not stored in the cache area 120, the read module 310B can output the access target data to the host device 10 without accessing the access area 410 as long as the access target data is stored in the cache area 320. Therefore, when a cache miss occurs in the cache area 120, the processing load on the non-volatile memory 40 can be reduced, and the latency until data is output from the memory system 20B can be reduced.

As described above, the frequency of the cache replacement processing for the cache area 120 is set lower than the frequency of the read access processing. As a result, data having a high access frequency in a medium to long term period is likely to be stored in the cache area 120. Therefore, data having a high access frequency in a short term period may not be stored in the cache area 120.

According to the third embodiment, every time a cache miss occurs in the cache area 320, access target data is read from the access area 410 and stored in the cache area 320.

As a result, it is possible to store, in the cache area 320, data having a high access frequency in a short term period that is difficult to be stored in the cache area 120. Therefore, it is possible to prevent access to the access area 410 even for data having a high access frequency in a short term period.

4. Fourth Embodiment

Next, an information processing system according to a fourth embodiment will be described. The fourth embodiment is different from the first embodiment in that a tag field is implemented in a memory system. In the following description, description of configurations and operations equivalent to those of the first embodiment will be omitted, and configurations and operations different from those of the first embodiment will be mainly described.

4.1 Functional Configuration of Information Processing System

FIG. 17 is a block diagram illustrating a functional configuration of the information processing system according to the fourth embodiment. FIG. 17 corresponds to FIG. 2 in the first embodiment. An information processing system 1C includes a host device 10C and a memory system 20C. The memory system 20C includes a memory controller 30C and a non-volatile memory 40. Since the configuration of the non-volatile memory 40 is equivalent to that of the first embodiment, the description will be omitted.

The host device 10C functions as a buffer area 110, a cache area 120C, a queue 130, an application 140C, a miss frequency collection module 150, and a cache replacement module 160. The memory controller 30C functions as a read module 310C and tag fields 330a and 330b. The functional configurations of the buffer area 110, the queue 130, the miss frequency collection module 150, and the cache replacement module 160 are equivalent to those of the first embodiment, and thus, the description will be omitted.

The cache area 120C includes data fields 121a and 121b, but does not include a tag field. The data fields 121a and 121b are associated with tag fields 330a and 330b in the memory controller 30C, respectively. The tag fields 330a and 330b have the equivalent configuration as the tag fields 122a and 122b have in the first embodiment.

The application 140C causes the read request to be stored in the SQ 131 in response to the occurrence of the read access processing. The application 140C acquires the data output from the memory system 20C as a result of the read request based on the pointer stored in the CQ 132.

Note that, as described above, the application 140C acquires the current number in response to the occurrence of the read access processing. The application 140C notifies the read module 310C of the current number (that is, the cache number used for the read access processing) by including the current number in the SQ 131.

Upon receiving the read request, the read module 310C determines to which of the tag fields 330a and 330b is referred based on the current number in the SQ 131. The read module 310C determines whether or not the access target data is stored in the cache area 120C by referring to the tag field 330a or 330b specified by the read request. In a case where the access target data is stored in the cache area 120C, the read module 310C outputs a pointer indicating the address of the cache area 120C in which the access target data is stored to the host device 10C. As a result, the pointer indicating the address of the cache area 120C in which the access target data is stored is stored in the CQ 132.

In a case where the access target data is not stored in the cache area 120C, the read module 310C reads the access target data from the non-volatile memory 40 via the memory bus MB. Then, the read module 310C outputs the access target data read from the non-volatile memory 40 to the host device 10C via the host bus HB. The output access target data is stored in the buffer area 110. As a result, the pointer indicating the address of the buffer area 110 in which the access target data is stored is stored in the CQ 132.

4.2 Read Access Processing

FIG. 18 is a flowchart illustrating an example of read access processing in an application of the information processing system according to the fourth embodiment. FIG. 18 corresponds to FIG. 5 in the first embodiment.

When a read access occurs (start), the application 140C increments the reference count value 141 in an active state (S71). More specifically, the application 140C acquires the cache number (current number) of the cache area 120C in an active state. Then, the application 140C increments the reference count value 141 of the current number.

The application 140C causes the read request of the access target data to be stored in the SQ 131 (S72). The SQ 131 includes the current number acquired in the processing of S71.

The application 140C stands by until the result of the read request stored in the SQ 131 in the processing of S72 is stored in the CQ 132 (S73).

After the processing of S73, the application 140C accesses the data indicated by the pointer stored in the CQ 132 as the access target data (S74).

After the processing of S74, the application 140C decrements the reference count value 141 of the current number (S75).

When the processing of S75 ends, the read access processing ends (end).

4.3 Read Processing

FIG. 19 is a flowchart illustrating an example of a read processing in a read module of the information processing system according to the fourth embodiment. FIG. 19 corresponds to FIG. 6 in the first embodiment.

When the read request is stored in the SQ 131 (start), the read module 310C refers to the tag field 330a or 330b of the current number in the SQ 131 to determine whether or not the access target data is stored in the cache area 120C. In other words, the read module 310C determines whether or not a cache hit has occurred (S81).

When a cache hit has occurred (S81; yes), the read module 310C outputs a pointer indicating the address of the data field 121a or 121b of the current number in which the access target data is stored to the host device 10C (S82). As a result, a pointer indicating the address of the data field 121a or 121b of the current number in which the access target data is stored is stored in the CQ 132.

When a cache miss occurs (S81; no), the read module 310C executes read processing of the access target data from the access area 410 in the non-volatile memory 40 (S83).

The read module 310C outputs the access target data read from the access area 410 by the processing of S83 to the host device 10C (S84). The data output to the host device 10C is stored in the buffer area 110. As a result, the pointer indicating the address of the buffer area 110 in which the access target data is stored is stored in the CQ 132.

When the processing of S82 or the processing of S84 ends, the read processing ends (end).

4.4 Effects According to Fourth Embodiment

According to the fourth embodiment, the tag fields 330a and 330b are managed by the memory controller 30C. As a result, the management load on the cache area 120C in the host memory 12 can be reduced.

Incidentally, in a case where the tag field is managed by the host device 10C, the tag field having a high access frequency is cached in a hardware cache (not illustrated) in the host device 10C. This reduces the margin of the memory area of the hardware cache in the host device 10C, which is not preferable.

According to the fourth embodiment, the tag fields 330a and 330b are offloaded by the memory controller 30C. Therefore, it is possible to prevent the tag field from being cached in the memory area of the hardware cache in the host device 10C.

5. Fifth Embodiment

Next, an information processing system according to a fifth embodiment will be described. The fifth embodiment is different from the first embodiment in that a miss frequency collection module is implemented in a memory system. In the following description, description of configurations and operations equivalent to those of the first embodiment will be omitted, and configurations and operations different from those of the first embodiment will be mainly described.

5.1 Functional Configuration of Information Processing System

FIG. 20 is a block diagram illustrating a functional configuration of the information processing system according to the fifth embodiment. FIG. 20 corresponds to FIG. 2 in the first embodiment.

An information processing system 1D includes a host device 10D and a memory system 20D. The memory system 20D includes a memory controller 30D and a non-volatile memory 40. Since the functional configuration of the non-volatile memory 40 is equivalent to that of the first embodiment, the description will be omitted.

The host device 10D functions as a buffer area 110, a cache area 120, a queue 130, an application 140, and a cache replacement module 160D. The memory controller 30D functions as a read module 310 and a miss frequency collection module 340. Since the functional configurations except the cache replacement module 160D and the miss frequency collection module 340 are equivalent to those of the first embodiment, the description will be omitted.

The miss frequency collection module 340 is a module that executes miss frequency collection processing. For example, the miss frequency collection module 340 counts the number of read requests for each address of access target each time the read request stored in the SQ 131 is acquired. The miss frequency collection module 340 stores the collected miss frequency as miss frequency information 341. The configuration of the miss frequency information 341 is equivalent to that of the miss frequency information 151 in the first embodiment.

The cache replacement module 160D determines which data has a high miss frequency among the data stored in the memory system 20D based on the miss frequency information 341. The cache replacement module 160D determines whether or not to replace the data stored in the cache area 120 with the data determined to have a high miss frequency. Then, in a case where it is determined to replace the data, the cache replacement module 160D replaces the data stored in the cache area 120 in an inactive state with the data having a high miss frequency. If it is determined not to replace the data, the cache replacement module 160D does not replace the data.

5.2 Effects According to Fifth Embodiment

According to the fifth embodiment, the miss frequency collection module 340 is implemented in the memory controller 30D. As a result, the load of the miss frequency collection processing can be offloaded from the processor 11 to the memory controller 30D. Therefore, the CPU load for managing the cache area 120 in the host device 10D can be further reduced.

6. Sixth Embodiment

Next, an information processing system according to a sixth embodiment will be described. The sixth embodiment is different from the fifth embodiment in that a cache replacement module is further implemented in a memory system in addition to a miss frequency collection module. In the following description, description of configurations and operations equivalent to those of the fifth embodiment will be omitted, and configurations and operations different from those of the fifth embodiment will be mainly described.

6.1 Functional Configuration of Information Processing System

FIG. 21 is a block diagram illustrating a functional configuration of the information processing system according to the sixth embodiment. FIG. 21 corresponds to FIG. 20 in the fifth embodiment.

An information processing system 1E includes a host device 10E and a memory system 20E. The memory system 20E includes a memory controller 30E and a non-volatile memory 40. Since the functional configuration of the non-volatile memory 40 is equivalent to that of the fifth embodiment, the description will be omitted.

The host device 10E functions as a buffer area 110, a cache area 120, a queue 130, and an application 140. The memory controller 30E functions as a read module 310, a miss frequency collection module 340, and a cache replacement module 350. Since the functional configurations except the cache replacement module 350 are equivalent to those of the fifth embodiment, the description will be omitted.

The cache replacement module 350 determines which data has a high miss frequency among the data stored in the memory system 20E based on miss frequency information 341. The cache replacement module 350 determines whether or not to replace the data stored in the cache area 120 with the data determined to have a high miss frequency. Then, in a case where it is determined to replace the data, the cache replacement module 350 replaces the data stored in the cache area 120 in an inactive state with the data having a high miss frequency. If it is determined not to replace the data, the cache replacement module 350 does not replace the data.

6.2 Effects According to Sixth Embodiment

According to the sixth embodiment, the cache replacement module 350 is implemented in the memory controller 30E. As a result, the load of the cache replacement processing can be offloaded from the processor 11 to the memory controller 30E. Therefore, the CPU load for managing the cache area 120 in the host device 10E can be further reduced.

7. Seventh Embodiment

Next, an information processing system according to a seventh embodiment will be described. The seventh embodiment is different from the first embodiment in that a memory chip in which replacement target data is stored (replacement target memory chip) is specified before specifying the replacement target data in a cache replacement processing. In the following description, description of configurations and operations equivalent to those of the first embodiment will be omitted, and configurations and operations different from those of the first embodiment will be mainly described.

7.1 Cache Replacement Processing

Figure 22:
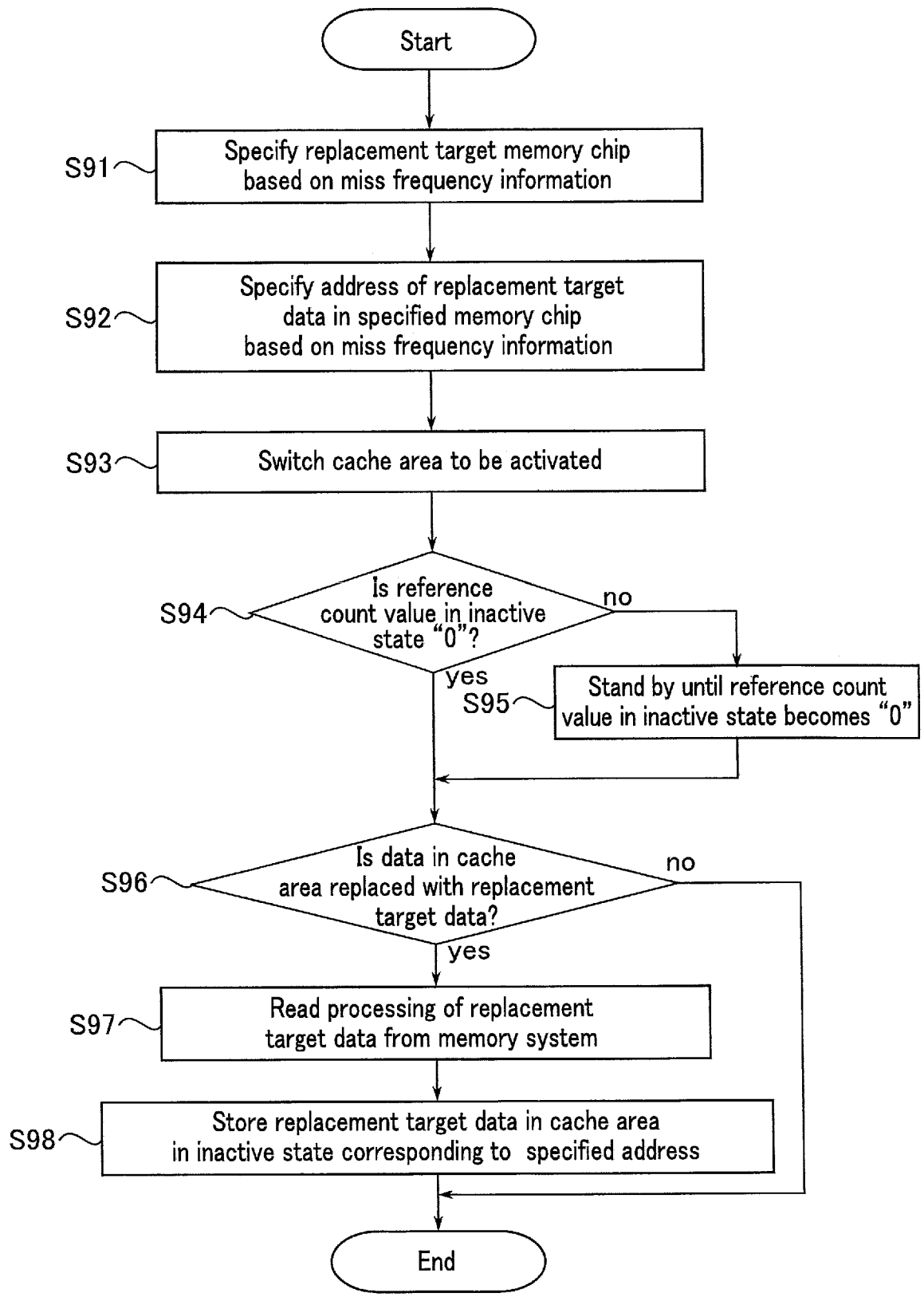
FIG. 22 is a flowchart illustrating an example of cache replacement processing in a cache replacement module of an information processing system according to a seventh embodiment.

FIG. 22 is a flowchart illustrating an example of cache replacement processing in a cache replacement module of an information processing system according to a seventh embodiment. FIG. 22 corresponds to FIG. 8 in the first embodiment.

When the second period elapses or the number of cache misses reaches the second number (start), a cache replacement module 160 specifies the replacement target memory chip from the plurality of memory chips CP_1 to CP_n based on miss frequency information 151 (S91).

Specifically, for example, the cache replacement module 160 specifies a memory chip having the maximum total number of cache misses among the plurality of memory chips CP_1 to CP_n.

The cache replacement module 160 specifies the address of the replacement target data from an access area 410 in the replacement target memory chip specified in the processing of S91 based on the miss frequency information 151 (S92). Specifically, for example, the cache replacement module 160 specifies the address of the access area 410 in which the data having the maximum miss frequency is stored.

The cache replacement module 160 switches the cache area 120 to be activated (S93).

The cache replacement module 160 determines whether or not a reference count value 141 in an inactive state in the read access processing is "0" (S94).

When the reference count value 141 in an inactive state is not "0" (S94; no), the cache replacement module 160 stands by until the reference count value 141 in an inactive state becomes "0" (S95).

When the reference count value 141 in an inactive state is "0" (S94; yes), or after the processing of S95, the cache replacement module 160 determines whether or not to replace the data in the cache area 120 (S96).

When it is determined that the data in the cache area 120 is to be replaced (S96; yes), the cache replacement module 160 causes the memory system 20 to execute read processing of the replacement target data (S97).

The cache replacement module 160 causes the replacement target data to be stored in the cache area 120 in an inactive state corresponding to the address specified in the processing of S92 (S98). Accordingly, the data stored up to the present in the cache area 120 in an inactive state corresponding to the address specified in the processing of S92 is evicted.

When it is determined that the data in the cache area 120 is not to be replaced (S96; no) or the processing of S98 ends, the cache replacement processing ends (end).

7.2 Effects According to Seventh Embodiment

According to the seventh embodiment, the cache replacement module 160 specifies the replacement target memory chip from the plurality of memory chips CP_1 to CP_n based on the miss frequency information 151. Specifically, the cache replacement module 160 specifies the memory chip having the highest access frequency as the replacement target memory chip. This makes it possible to avoid concentration of accesses to a specific memory chip. Therefore, a period during which the memory controller 30 does not operate the plurality of memory chips CP_1 to CP_n in parallel can be shortened. Therefore, the performance of the memory system 20 can be maximized.

8. Modifications and the Like

The above-described first to seventh embodiments are not limited to the above-described examples, and various modifications can be applied.

For example, descriptions have been given on the case where the third to seventh embodiments described above are applied to the first embodiment, but the present invention is not limited thereto. The third to seventh embodiments described above may be applied to the second embodiment. That is, in the cache replacement processing of the third to seventh embodiments described above, whether or not to cache the replacement target data may be determined based on whether the miss frequency of access target data or the access frequency of replacement target data is greater. Furthermore, the third to seventh embodiments described above may be combined with each other.

In addition, for example, in the first to seventh embodiments described above, a case where one memory system is coupled to the host device 10 via the host bus HB has been described, but the present invention is not limited thereto. A plurality of memory systems 20 may be coupled to the host device 10 via the host bus HB.

FIG. 23 is a block diagram illustrating an example of a hardware configuration of an information processing system according to a modification. FIG. 23 corresponds to FIG. 1 in the first embodiment. The information processing system 1F includes a host device 10 and a plurality of memory systems 20_1, . . . , and 20_m (m is an integer of 2 or more).

The configuration of each of the plurality of memory systems 20_1 to 20_m is equivalent to the configuration of the memory system 20 in the first embodiment. Each of the plurality of memory systems 20_1 to 20_m is commonly coupled to the host device 10 via the host bus HB.

In a case where the above-described modification is applied to the fourth embodiment, each of the plurality of memory systems 20_1 to 20_m stores tag fields 330a and 330b associated with data fields 121a and 121b corresponding to its own access area 410. In this case, the data fields 121a and 121b may be divided by the number of memory systems 20_1 to 20_m. As a result, the application 140C can inquire of the memory system from which the access target data is read when the cache miss occurs among the plurality of memory systems 20_1 to 20_m whether the cache hit has occurred.

In a case where the above-described modification is applied to the fifth embodiment, the miss frequency collection module 340 of each of the plurality of memory systems 20_1 to 20_m stores the miss frequency information 341 based on the read request for its own access area 410 stored in the SQ 131. A cache replacement module 160D aggregates the miss frequency information 341 stored in each of plurality of memory systems 20_1 to 20_m and specifies the address of the replacement target data.

In a case where the above-described modification is applied to the sixth embodiment, the cache replacement module 350 can be provided in each of the plurality of memory systems 20_1 to 20_m. In this case, the cache area 120 is managed independently for each memory system. That is, the data fields 121a and 121b and the tag fields 122a and 122b are divided into independent areas for each memory system. Switching between the active state and the inactive state of the cache area 120 is also independently controlled for each memory system. Then, the cache replacement module 350 of each of the plurality of memory systems 20_1 to 20_m specifies the address of the replacement target data based on the miss frequency information 341 collected by its own miss frequency collection module 340.

Alternatively, in a case where the above-described modification is applied to the sixth embodiment, the cache replacement module 350 can be provided in one memory system of the plurality of memory systems 20_1 to 20_m. The cache replacement module 350 aggregates the miss frequency information 341 collected by each miss frequency collection module 340 of the memory systems 20_1 to 20_m and specifies the address of the replacement target data. In this case, the cache area 120 does not need to be managed independently for each memory system.

Although some embodiments of the present invention have been described, these embodiments have been presented as examples, and are not intended to limit the scope of the invention. These embodiments can be implemented in various other forms, and various omissions, substitutions, and changes can be made without departing from the gist of the invention. These embodiments and modifications thereof are included in the scope and gist of the invention and are included in the invention described in the claims and the equivalent scope thereof.

What is claimed is:
1. An information processing system comprising:
a memory system including a non-volatile memory; and
a host device including a host memory and a processor executing software for accessing data stored in the non-volatile memory,
wherein the processor is configured to:
allocate a cache area in the host memory to cache data stored in the non-volatile memory;
when the software is executed,
perform a tag lookup of the cache area, and
in a case where a cache hit has occurred upon the lookup, access the cache area without accessing the non-volatile memory;
refill the data stored in the non-volatile memory into the cache area at a second frequency lower than a first frequency at which a cache miss occurs;
calculate the first frequency for each access destination of the non-volatile memory;
specify data to be cached in the cache area based on the calculated first frequency for the respective access destinations; and
refill data stored in an access destination with the first frequency higher than a third frequency into the cache area, the third frequency being a frequency at which the cache hit occurs in a memory area corresponding to the access destination in the cache area.

2. The information processing system according to claim 1, wherein
the cache area has a direct-mapped data structure.

3. An information processing comprising:
a memory system including a non-volatile memory; and
a host device including a host memory, a processor executing software for accessing data stored in the non-volatile memory, and a queue,
wherein the processor is configured to:
    allocate a cache area in the host memory to cache data stored in the non-volatile memory;
    when the software is executed,
        perform a tag lookup of the cache area, and
        in a case where a cache hit has occurred upon the lookup, access the cache area without accessing the non-volatile memory;
    refill the data stored in the non-volatile memory into the cache area at a second frequency lower than a first frequency at which a cache miss occurs;
    calculate the first frequency for each access destination of the non-volatile memory;
    specify data to be cached in the cache area based on the calculated first frequency for the respective access destinations;
    count a number of requests for access to the non-volatile memory, the requests being stored in the queue; and
    calculate the first frequency for the respective access destinations based on the number of requests.

4. An information processing system comprising:
a memory system including a non-volatile memory; and
a host device including a host memory and a processor executing software for accessing data stored in the non-volatile memory,
wherein the processor is configured to:
    allocate a cache area in the host memory to cache data stored in the non-volatile memory;
    when the software is executed,
        perform a tag lookup of the cache area, and
        in a case where a cache hit has occurred upon the lookup, access the cache area without accessing the non-volatile memory;
    refill the data stored in the non-volatile memory into the cache area at a second frequency lower than a first frequency at which a cache miss occurs;
    calculate the first frequency for each access destination of the non-volatile memory;
    specify data to be cached in the cache area based on the calculated first frequency for the respective access destinations; and
    specify the data to be cached in the cache area based on a relative high-low comparison relationship between the first frequencies for the respective access destinations.

5. An information processing system comprising:
a memory system including a non-volatile memory, the non-volatile memory including a plurality of memory chips; and
a host device including a host memory and a processor executing software for accessing data stored in the non-volatile memory,
wherein the processor is configured to:
    allocate a cache area in the host memory to cache data stored in the non-volatile memory;
    when the software is executed,
        perform a tag lookup of the cache area, and
        in a case where a cache hit has occurred upon the lookup, access the cache area without accessing the non-volatile memory;
    refill the data stored in the non-volatile memory into the cache area at a second frequency lower than a first frequency at which a cache miss occurs;
    calculate the first frequency for each access destination of the non-volatile memory;
    specify data to be cached in the cache area based on the calculated first frequency for the respective access destinations;
    specify a first memory chip based on a relative high-low comparison relationship between the first frequencies for the respective memory chips; and
    specify the data to be cached in the cache area based on a relative high-low comparison relationship between the first frequencies for the respective access destinations on the first memory chip.

6. An information processing system comprising:
a memory system including a non-volatile memory and a control circuit; and
a host device including a host memory and a processor executing software for accessing data stored in the non-volatile memory,
wherein the processor is configured to:
    allocate a cache area in the host memory to cache data stored in the non-volatile memory;
    when the software is executed,
        perform a tag lookup of the cache area, and
        in a case where a cache hit has occurred upon the lookup, access the cache area without accessing the non-volatile memory; and
    refill the data stored in the non-volatile memory into the cache area at a second frequency lower than a first frequency at which a cache miss occurs;
the control circuit is configured to calculate the first frequency for each access destination in the non-volatile memory, and
the processor is configured to:
    specify data to be cached in the cache area based on the calculated first frequency for each access destination; and
    refill data stored in an access destination with the first frequency higher than a third frequency into the cache area, the third frequency being a frequency at which the cache hit occurs in a memory area corresponding to the access destination in the cache area.

7. The information processing system according to claim 6, wherein
the host device further includes a queue, and
the control circuit is configured to calculate the first frequency for each access destination based on a count of requests for access to the non-volatile memory, the requests being stored in the queue.

8. The information processing system according to claim 6, wherein
the cache area has a direct-mapped data structure.

9. An information processing system comprising:
a memory system including a non-volatile memory; and
a host device including a host memory and a processor executing software for accessing data stored in the non-volatile memory,
wherein the processor is configured to:

allocate a cache area in the host memory to cache data stored in the non-volatile memory, the cache area including a first memory area and a second memory area;

when the software is executed,
perform a tag lookup of the cache area, and
in a case where a cache hit has occurred upon the lookup, access the cache area without accessing the non-volatile memory;

refill the data stored in the non-volatile memory into the cache area at a second frequency lower than a first frequency at which a cache miss occurs;

refill data stored in an access destination with the first frequency higher than a third frequency into the cache area, the third frequency being a frequency at which the cache hit occurs in a memory area corresponding to the access destination in the cache area;

set one of the first memory area and the second memory area to be active and the other to be inactive; and refill the data stored in the non-volatile memory into the inactive memory area of the first memory area and the second memory area.

10. The information processing system according to claim 9, wherein
the processor is configured to switch the inactive memory area into active and the active memory area into inactive in each case of specifying data to be cached in the cache area.

11. The information processing system according to claim 9, wherein
the processor is configured to:
calculate the first frequency for each access destination of the non-volatile memory; and
specify data to be cached in the inactive memory area based on the calculated first frequency for the respective access destinations.

12. The information processing system according to claim 11, wherein
the host device further includes a queue, and
the processor is configured to calculate the first frequency for the respective access destinations based on a count of requests for access to the non-volatile memory, the requests being stored in the queue.

13. The information processing system according to claim 11, wherein
the processor is configured to specify the data to be cached in the inactive memory area based on a relative high-low comparison relationship between the first frequencies for the respective access destinations.

14. The information processing system according to claim 11, wherein
the non-volatile memory includes a plurality of memory chips, and
the processor is configured to:
specify a first memory chip based on a relative high-low comparison relationship between the first frequencies for the respective memory chips; and
specify the data to be cached in the inactive memory area based on a relative high-low comparison relationship between the first frequencies for the respective access destinations on the first memory chip.

15. The information processing system according to claim 11, wherein
the cache area has a direct-mapped data structure.

16. The information processing system according to claim 9, wherein
the memory system further includes a control circuit,
the control circuit is configured to calculate the first frequency for each access destination in the non-volatile memory, and
the processor is configured to specify data to be cached in the inactive memory area based on the calculated first frequency for each access destination.

17. The information processing system according to claim 16, wherein
the host device further includes a queue, and
the control circuit is configured to calculate the first frequency for each access destination based on a count of requests for access to the non-volatile memory, the requests being stored in the queue.

18. The information processing system according to claim 16, wherein
the processor is configured to specify the data to be cached in the inactive memory area based on a relative high-low comparison relationship between the first frequencies for the respective access destinations.

19. The information processing system according to claim 16, wherein
the non-volatile memory includes a plurality of memory chips, and
the processor is configured to:
specify a first memory chip based on a relative high-low comparison relationship between the first frequencies for the respective memory chips; and
specify the data to be cached in the inactive memory area based on a relative high-low comparison relationship between the first frequencies for the respective access destinations on the first memory chip.

20. The information processing system according to claim 16, wherein
the cache area has a direct-mapped data structure.

* * * * *